(12) United States Patent
Becker et al.

(10) Patent No.: US 11,225,543 B2
(45) Date of Patent: Jan. 18, 2022

(54) SOFTENING THERMOPLASTIC POLYURETHANES USING IONOMER TECHNOLOGY

(71) Applicants: THE UNIVERSITY OF AKRON, Akron, OH (US); COVESTRO LLC, Pittsburgh, PA (US)

(72) Inventors: Matthew Becker, Stow, OH (US); Robert A. Weiss, Lenox, MA (US); Zachary Kurtiss Zander, Sheffield Village, OH (US); Don S. Wardius, Pittsburgh, OH (US); Karl W. Haider, Wexford, PA (US); Bruce D. Lawrey, Carnegie, PA (US)

(73) Assignee: The University of Akron, Akron, OH (US)

( * ) Notice: Subject to any disclaimer, the term of this patent is extended or adjusted under 35 U.S.C. 154(b) by 89 days.

(21) Appl. No.: 16/286,024

(22) Filed: Feb. 26, 2019

(65) Prior Publication Data
US 2019/0185609 A1    Jun. 20, 2019

Related U.S. Application Data

(62) Division of application No. 15/166,948, filed on May 27, 2016, now Pat. No. 10,227,440.
(Continued)

(51) Int. Cl.
*C08G 18/08*    (2006.01)
*C08G 18/10*    (2006.01)
(Continued)

(52) U.S. Cl.
CPC ......... *C08G 18/10* (2013.01); *C08G 18/0814* (2013.01); *C08G 18/0828* (2013.01);
(Continued)

(58) Field of Classification Search
CPC ................. C08G 18/0814; C08G 18/0828
See application file for complete search history.

(56) References Cited

U.S. PATENT DOCUMENTS

| 4,108,814 A | 8/1978 | Reiff et al. |
| 4,173,695 A | 11/1979 | Brenner et al. |

(Continued)

FOREIGN PATENT DOCUMENTS

| EP | 0007758 B1 | 3/1983 |
| EP | 0590890 | 9/1993 |

(Continued)

OTHER PUBLICATIONS

Weiss, R.A., P.K. Agarwal, and R.D. Lundberg; 1984. The control of ionic interactions in sulfonated polystyrene ionomers by using alkyl-substituted ammomium counterions, J. Appl. Polym. Sci. 29:2719-273 Polyurethane ionomers.
(Continued)

*Primary Examiner* — Michael L Leonard
(74) *Attorney, Agent, or Firm* — Renner, Kenner, Greive, Bobak, Taylor & Weher

(57) ABSTRACT

In one or more embodiments, the present invention provides a novel approach to the addition of plasticizers for softening TPUs, i.e., lowering the durometer and the melt viscosity. This approach involves incorporating bonded sulfonate groups with quaternary ammonium counterions into the TPU. In one or more embodiments of the present invention, the softening of TPU is achieved by incorporating an ionic diol, such as N,N-bis (2-hydroxyethyl)-2-aminoethanesulfonic acid (BES), coupled with various bulky alkyl ammonium cations, during the chain extension step of the TPU synthesis. It is believed that that steric hindrance of the bulky quaternary ammonium groups weakens the dipole-dipole interactions of the sulfonate groups and/or lowers the crystallinity of the hard block, thereby creating additional
(Continued)

free volume that softens the polymer and lowers the melt viscosity.

39 Claims, 18 Drawing Sheets

Related U.S. Application Data

(60) Provisional application No. 62/166,753, filed on May 27, 2015.

(51) Int. Cl.
    *C08G 18/60*     (2006.01)
    *C08G 18/76*     (2006.01)
    *C08G 18/42*     (2006.01)
    *C08G 18/44*     (2006.01)
    *C08G 18/48*     (2006.01)

(52) U.S. Cl.
    CPC ............. *C08G 18/42* (2013.01); *C08G 18/44* (2013.01); *C08G 18/48* (2013.01); *C08G 18/603* (2013.01); *C08G 18/7671* (2013.01)

(56) References Cited

U.S. PATENT DOCUMENTS

| | | | |
|---|---|---|---|
| 4,293,474 A | | 10/1981 | Dieterich et al. |
| 4,304,702 A | | 12/1981 | Makowski et al. |
| 4,511,712 A | | 4/1985 | Florence |
| 4,619,973 A | | 10/1986 | Smith, Jr. |
| 4,775,591 A | | 10/1988 | Campbell et al. |
| 4,880,883 A | | 11/1989 | Grasel et al. |
| 5,039,732 A | * | 8/1991 | Arora ................ C08G 18/0823 524/591 |
| 5,583,176 A | * | 12/1996 | Häberle ............ C08G 18/5072 524/590 |
| 5,716,676 A | * | 2/1998 | Schutze ............ C08G 18/0804 427/323 |
| 6,207,784 B1 | | 3/2001 | Rajagopalan |
| 6,949,604 B2 | | 9/2005 | Risen, Jr. et al. |
| 7,989,534 B2 | | 8/2011 | Bhiwankar et al. |
| 8,034,873 B2 | | 10/2011 | Siddhamalli |
| 8,299,147 B2 | | 10/2012 | Wu |
| 2004/0236030 A1 | | 11/2004 | Kim et al. |
| 2007/0049685 A1 | | 3/2007 | Hansel et al. |
| 2008/0139774 A1 | | 6/2008 | Lawrey et al. |
| 2008/0175875 A1 | | 7/2008 | Sunkara |
| 2008/0194789 A1 | | 8/2008 | Duwenhorst et al. |
| 2009/0176917 A1 | | 7/2009 | Lubker et al. |
| 2009/0183773 A1 | | 7/2009 | Samuels et al. |
| 2009/0247674 A1 | | 10/2009 | Nakao |

FOREIGN PATENT DOCUMENTS

| | | | | |
|---|---|---|---|---|
| JP | 2001048858 | | 2/2001 | |
| JP | 2001354742 | | 12/2001 | |
| WO | 1990009404 | A1 | 8/1990 | |
| WO | 1994010214 | | 5/1994 | |
| WO | WO-03011949 | A1 * | 2/2003 | ......... C08G 18/0823 |
| WO | 2004003047 | A1 | 1/2004 | |
| WO | 2008021292 | A2 | 2/2008 | |

OTHER PUBLICATIONS

Cable, K.M. Maurtz, K.A. Moore, R.B.; Journal of Polymer Scients, Part B; Polymer Physics 1995, 33, (1065-1072).

Weiss, R.A. and H. Stamato, 1989; Development of an ionomer tracer for extruder residence time distribution experiments. Polym. Eng. Sci. 29; 134-140.

D. Dietrerich, W. Keberle, D.H. Witt, Poluurethane Ionomers, a New Class of Block Polymers; Angewandte Chemie International Edition in English, vol. 9, Issue 1, pp. 40-50, Jan. 1970.

H.S. Egboht, A. Ghaffart, M.H. George J.A. Barrie, D.J. Walsh; Synthesis and characterization of some polyurethane ionomers, doi 10 1016/0032-3861(82)9037 Polymer, vol. 23, Issue 8, Jul. 1982, pp. 1167-1171.

Krol, P., "Synthesis methods, chemical structures and phase structures of linear polyurethanes", Progress in Materials Science, 2007, vol. 52, pp. 915-1015.

Scott, M.P.; et al. "Application of ionic liquids as plasticizers for poly{methyl methacrylate)", Chem. Commun. 2002, pp. 1370-1371.

* cited by examiner

SOFTENING THERMOPLASTIC POLYURETHANES USING IONOMER TECHNOLOGY

CROSS REFERENCE TO RELATED APPLICATIONS

This application claims the benefit of U.S. patent application Ser. No. 15/166,948 entitled "Softening Thermoplastic Polyurethanes Using Ionomer Technology," filed May 27, 2016, which claims the benefit of U.S. provisional patent application Ser. No. 62/166,753 entitled "Softening Thermoplastic Polyurethanes Using Ionomer Technology," filed May 27, 2015, both of which are incorporated herein by reference in its entirety.

NAMES OF THE PARTIES TO A JOINT RESEARCH AGREEMENT

The present application stems from work done pursuant to a Joint Research Agreement between The University of Akron in Akron, Ohio and Bayer MaterialScience LLC, of Pittsburgh, Pa.

FIELD OF THE INVENTION

One or more embodiments of the present invention relates to a method of softening thermoplastic polyurethanes. In certain embodiments, present invention relates to a method of softening thermoplastic polyurethanes using ionomer technology.

BACKGROUND OF THE INVENTION

Ionomers are polymers that contain a small concentration of covalently bonded ionic species, such as carboxylate, sulfonate or phosphonate groups. In most cases, "hard" counterions, such as metal ions, are used to form the ion-pair, which in ionomers is condensed because of the relatively low dielectric constant of the polymer matrix. This characteristic, in addition to the relatively low ion density, distinguishes ionomers from polyelectrolytes, which are highly charged polymers that are usually water soluble. The interest in ionomers stems from the large property changes that result from interchain supramolecular bonding of the contact ion-pairs. These interactions represent transient, reversible crosslinks that generally increase the modulus, strength, and toughness of the ionomer, though some extensibility of the parent polymer is lost due to the formation of a physical network. The presence of the ionic groups and phase-separated ionic nanodomains, often termed ionic clusters, that form in most ionomers also affect the glass transition temperature and the transport properties of the material.

Less common is the addition of ionic functionality to a polymer for the purpose of internally plasticizing the polymer. This can be achieved by using bulky counterions, e.g., alkyl ammonium or phosphonium ions that weaken the ionic, dipole-dipole, or ion-dipole interactions responsible for the mechanical and physical property changes. For example, Weiss et al. and Weiss and Stamato[7] used alkyl ammonium cations with varying alkyl chain lengths to lower the glass transition and melt viscosity of sulfonated polystyrene ionomers.

Thermoplastic polyurethanes (TPU) are linear segmented block copolymers that possess polar hard segments derived from diisocyanates, such as methylene diphenyl diisocyanate (MDI), and relatively non-polar soft segments formed from oligomeric diols, such as polyesters and polycarbonates. The disparity in the polarity of these two segments and the crystallizability of the hard segment produces microphase separation of the hard segments into nanodomains that provide physical crosslinks responsible for the desirable properties of TPUs, such as excellent elasticity, abrasion resistance, and toughness. Crystallization of the hard segments also increases the modulus and hardness (durometer) of a TPU. TPUs with lower durometer are normally achieved by adding low molecular weight plasticizers, such as dipropylene glycol dibenzoate or benzoate esters. However, those compositions tend to be tacky and are often difficult to process for use in common TPU applications. In addition, plasticizer leaching and migration is a major industrial challenge that eventually leads to a decline in the thermal and mechanical properties of plastics, and has also brought about serious health and environmental concerns. As a result, increasing restrictions on the use of traditional plasticizers have created a demand for alternative methods for softening TPUs.

Accordingly, what is needed in the art is a plasticizer, and related method for softening TPUs for processing, that does not leach or migrate out of the TPU or bring about a decline in its thermal and mechanical properties.

SUMMARY OF THE INVENTION

In one or more embodiments, the present invention provides a novel approach to the addition of plasticizers for softening TPUs, i.e., lowering the durometer and the melt viscosity. This approach involves incorporating bonded sulfonate groups with quaternary ammonium counterions into the TPU, as illustrated in FIG. 1. In one or more embodiments of the present invention, the softening of TPU is achieved by incorporating an ionic diol, such as N,N-bis (2-hydroxyethyl)-2-aminoethane-sulfonic acid (BES), coupled with various bulky alkyl ammonium cations, during the chain extension step of the TPU synthesis. It is believed that that steric hindrance of the bulky quaternary ammonium groups weakens the dipole-dipole interactions of the sulfonate groups and/or lowers the crystallinity of the hard block, thereby creating additional free volume that softens the polymer and lowers the melt viscosity. Unlike prior art methods for softening TPUs with conventional low molecular weight plasticizers that can diffuse out of the polymer, the ammonium counterions in these compositions have been found to be non-fugitive and non-extractable, presumably because of the strong Coulombic interactions with the fixed counterion and the large enthalpic penalty that would accrue if two free ions were created in the non-polar continuous phase.

In a first aspect the present invention is directed to a thermoplastic polyurethane ionomer containing the residue of an ionic monomer comprising a sulfonate containing diol or polyol ion (anion) and a quaternary ammonium counterion (cation), wherein the ionic monomer has been covalently bonded into the backbone of the thermoplastic polyurethane ionomer. In one or more embodiments, the sulfonate containing diol or polyol ion is formed from N,N-bis(2-hydroxyethyl)-2-aminoethane-sulfonic acid (BES), 2,3-dihydroxypropanesulfonic acid or polyethersulfonate.

In one or more embodiments, the thermoplastic polyurethane ionomer of the present invention includes any one or more of the above referenced embodiments of the first aspect of the present invention wherein the sulfonate containing diol or polyol anion has the formula:

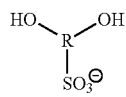

wherein R is a hydrocarbon or oligomeric polyether, and possesses either a tertiary carbon or nitrogen atom to afford the sulfonated side chain.

In one or more embodiments, the thermoplastic polyurethane ionomer of the present invention includes any one or more of the above referenced embodiments of the first aspect of the present invention wherein the sulfonate containing diol or polyol ion has a formula selected from:

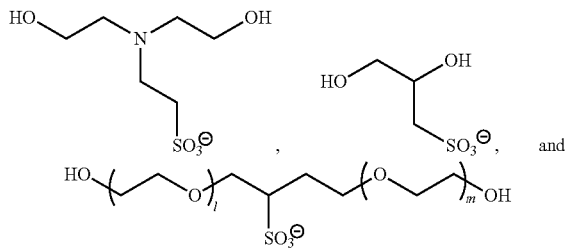

wherein l is an integer from 1 to 20; and m is an integer from 1 to 20

In one or more embodiments, the thermoplastic polyurethane ionomer of the present invention includes any one or more of the above referenced embodiments of the first aspect of the present invention wherein the quaternary ammonium counterion is selected from the group consisting of didodecyldimethylammonium (DDA), a tetrahexylammonium (THA), terakis(decyl)ammonium (TDA), trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis(decyl) ammonium, tetraoctylammonium, tetraheptylammonium, tetrahexylammonium, tetrabutylammonium, and combinations thereof.

In one or more embodiments, the thermoplastic polyurethane ionomer of the present invention includes any one or more of the above referenced embodiments of the first aspect of the present invention wherein the quaternary ammonium counterion has the formula:

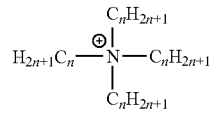

wherein n is an integer from 1 to 18 and the nitrogen atom of the quaternary ammonium counterion contains no more than three methyl side groups.

In one or more embodiments, the thermoplastic polyurethane ionomer of the present invention includes any one or more of the above referenced embodiments of the first aspect of the present invention wherein the ionic monomer has the formula:

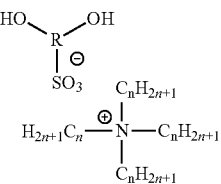

wherein R is a hydrocarbon or oligomeric polyether, and possesses either a tertiary carbon or nitrogen atom to afford the sulfonated side chain; n is an integer from 1 to 18; and the nitrogen atom of the quaternary ammonium counterion contains no more than three methyl side groups.

In one or more embodiments, the thermoplastic polyurethane ionomer of the present invention includes any one or more of the above referenced embodiments of the first aspect of the present invention wherein the ionic monomer has the formula selected from:

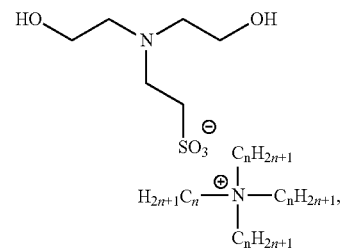

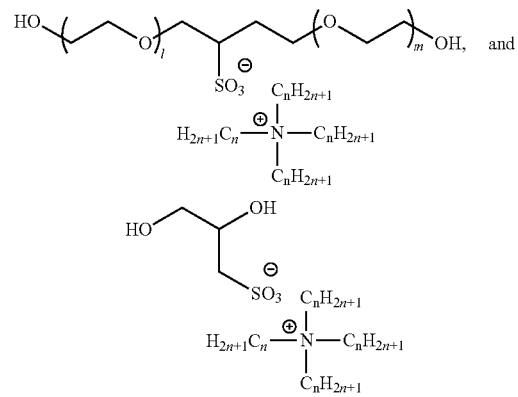

wherein l is an integer from 1 to 20; m is an integer from 1 to 20; n is an integer from 1 to 18; and the nitrogen atom of the quaternary ammonium counterion contains no more than three methyl side groups.

In one or more embodiments, the thermoplastic polyurethane ionomer of the present invention includes any one or more of the above referenced embodiments of the first aspect of the present invention having the formula:

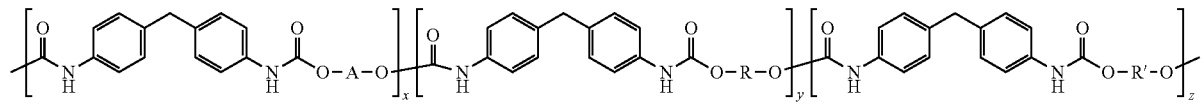

wherein A is the residue of a polyester, polycarbonate, polyether or polyamide diol having a weight average molecular weight of from 500 g/mol to about 10,000 g/mol; R is the residue of an ionic monomer comprising sulfonic acid containing polyol ion and a quaternary ammonium counterion; R' is a residue of a $C_2$ to $C_{12}$ diol; x is a mole fraction from about 0.005 to about 0.8; y is a mole fraction from about 0.005 to about 0.8; and z is mole fraction from about 0.005 to about 0.9. In one or more embodiments, the thermoplastic polyurethane ionomer of the present invention includes any one or more of the above referenced embodiments of the first aspect of the present invention wherein R is the residue of an ionic monomer comprising N,N-bis(2-hydroxyethyl)-2-aminoethane-sulfonic acid (BES), N,N-bis(2-hydroxypropyl)-2-aminoethane-sulfonic acid, N,N-bis(2-hydroxybutyl)-2-aminoethane-sulfonic acid or any other sulfonic acid containing polyol.

In one or more embodiments, the thermoplastic polyurethane ionomer of the present invention includes any one or more of the above referenced embodiments of the first aspect of the present invention wherein A is the residue of a diol having a formula selected from:

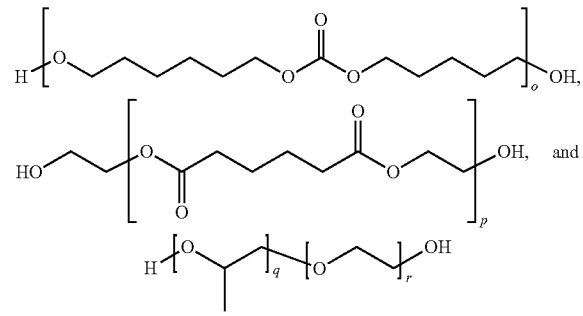

wherein o is an integer from about 1 to about 1000; p is an integer from about 1 to about 1000; q is an integer from about 1 to about 500; and r is an integer from about 1 to about 500. In one or more embodiments, the thermoplastic polyurethane ionomer of the present invention includes any one or more of the above referenced embodiments of the first aspect of the present invention containing from about 0.5% by weight to about 30% by weight of the quaternary ammonium cation.

In one or more embodiments, the thermoplastic polyurethane ionomer of the present invention includes any one or more of the above referenced embodiments of the first aspect of the present invention having a Shore A durometer hardness of from about 20 to about 100. In one or more embodiments, the thermoplastic polyurethane ionomer of the present invention includes any one or more of the above referenced embodiments of the first aspect of the present invention wherein the residue of the ionic monomer comprise from about 0.5% to about 30% by weight of the thermoplastic polyurethane ionomer.

In one or more embodiments, the thermoplastic polyurethane ionomer of the present invention includes any one or more of the above referenced embodiments of the first aspect of the present invention having a $T_g$ of from about $-150°$ C. to about $75°$ C. In one or more embodiments, the thermoplastic polyurethane ionomer of the present invention includes any one or more of the above referenced embodiments of the first aspect of the present invention having a weight average molecular weight of from about 5,000 Da to about 2,000,000 Da.

In a second aspect, the present invention is directed to a chain extender for use in softening thermoplastic polyurethanes for processing comprising a sulfonate containing diol anion and a quaternary ammonium cation. In some embodiments, the sulfonate containing diol or polyol anion is formed from N,N-bis(2-hydroxyethyl)-2-aminoethane-sulfonic acid (BES). In one or more embodiments, the chain extender of the present invention includes any one or more of the above referenced embodiments of the second aspect of the present invention wherein the quaternary ammonium cation is selected from the group consisting of a didodecyldimethylammonium (DDA) cation, a tetrahexylammonium (THA) cation, a terakis (decyl) ammonium (TDA) cation, trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis(decyl) ammonium, tetraoctylammonium, tetraheptylammonium, tetrahexylammonium, tetrabutylammonium, and combinations thereof.

In one or more embodiments, the chain extender of the present invention includes any one or more of the above referenced embodiments of the second aspect of the present invention having the formula:

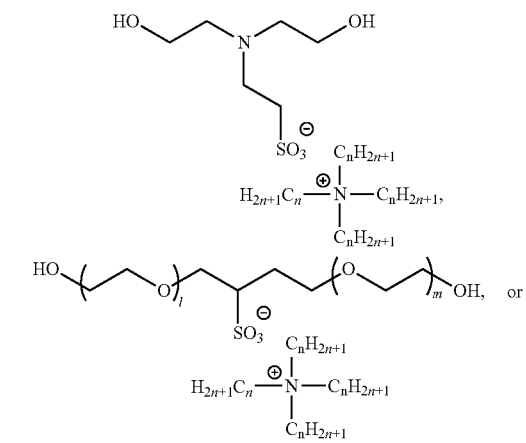

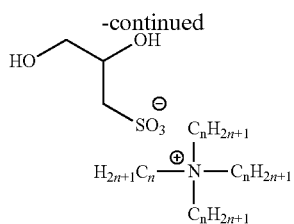

where n is an integer from 1 to 18; 1 is an integer from 1 to 20; m is an integer from 1 to 20; and the nitrogen atom of the quaternary ammonium cation contains no more than three methyl side groups In a third aspect, the present invention is directed to a method of making a thermoplastic polyurethane ionomer comprising: preparing an ionic monomer comprising a sulfonic acid containing polyol anion and a quaternary ammonium cation, the ionic monomer further comprising two hydroxyl functional groups; reacting a diisocyanate with one or more linear diol or polyol to form a polyurethane pre-polymer; preparing a solution containing the ionic monomer and an additional quantity of the one or more linear polyol; and reacting the ionic monomer solution with the polyurethane pre-polymer to form a thermoplastic polyurethane ionomer having the residue of the ionic monomer integrated into the backbone of the thermoplastic polyurethane ionomer. In one or more of these embodiments, the ionic monomer comprises a N,N-bis(2-hydroxyethyl)-2-aminoethane-sulfonic acid (BES), 2,3-dihydroxypropane-sulfonic acid or polyethersulfonate anion.

In one or more embodiments, the method of the present invention includes any one or more of the above referenced embodiments of the third aspect of the present invention wherein the ionic monomer is dissolved in a solvent selected from the group consisting of water, methanol and water, ethanol, propanol, isopropanol, and combinations thereof. In one or more embodiments, the method of the present invention includes any one or more of the above referenced embodiments of the third aspect of the present invention wherein the step of reacting further comprises the addition of a catalyst selected from the group consisting of stannous octoate, 1,4-diazabicyclo[2.2.2.]octane (DABCO), dibutyltin dilaurate, bismuth octanoate, UV light and combinations thereof.

In one or more embodiments, the method of the present invention includes any one or more of the above referenced embodiments of the third aspect of the present invention wherein the quaternary ammonium cation is selected from the group consisting of a didodecyldimethylammonium (DDA) cation, a tetrahexylammonium (THA) cation, a terakis(decyl)ammonium (TDA) cation, trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis(decyl) ammonium, tetraoctylammonium, tetraheptylammonium, tetrahexylammonium, tetrabutylammonium, and combinations thereof.

In one or more embodiments, the method of the present invention includes any one or more of the above referenced embodiments of the third aspect of the present invention wherein the diisocyanate is selected from the group consisting of 4,4'-methylenebis(phenyl isocyanate) (MDI), isophorone diisocyanate (IPDI), and tolylene-2,4-diisocyanate (TDI). In one or more embodiments, the method of the present invention includes any one or more of the above referenced embodiments of the third aspect of the present invention wherein the diisocyanate further comprises 1,12-diisocyanatododecane, 1,8-diisocyanatooctane, 1,6-diisocyanatohexane, 1,5-diisocyanatopentane, 1,4-diisocyanatobutane, 1,3-bis(isocyanatomethyl)cyclohexane, individual isomers or mixtures of isomers of 4,4'-methylenebis(cyclohexyl isocyanate) 1,3-phenylene diisocyanate, and tolylene-2,6-diisocyanate, or isomers and combinations thereof.

In one or more embodiments, the method of the present invention includes any one or more of the above referenced embodiments of the third aspect of the present invention wherein the one or more linear diol or polyol are each selected from the group consisting of polycarbonate diols, polyester diols, polyether diols having a weight average molecular weight of from about 500 g/mol to about 10,000 g/mol, linear $C_2$-$C_{12}$ diols, and combinations thereof. In one or more embodiments, the method of the present invention includes any one or more of the above referenced embodiments of the third aspect of the present invention wherein the one or more linear polyol or diol are each selected from the group consisting of, 1,4-butanediol (BDO), ethylene glycol, 1,3-propanediol, 1,4-butanediol, 1,6-hexanediol, 1,8-octanediol, 1,10-decanediol, 1,12-dodecanediol, and combinations thereof.

In one or more embodiments, the method of the present invention includes any one or more of the above referenced embodiments of the third aspect of the present invention wherein the ionic monomer has the formula:

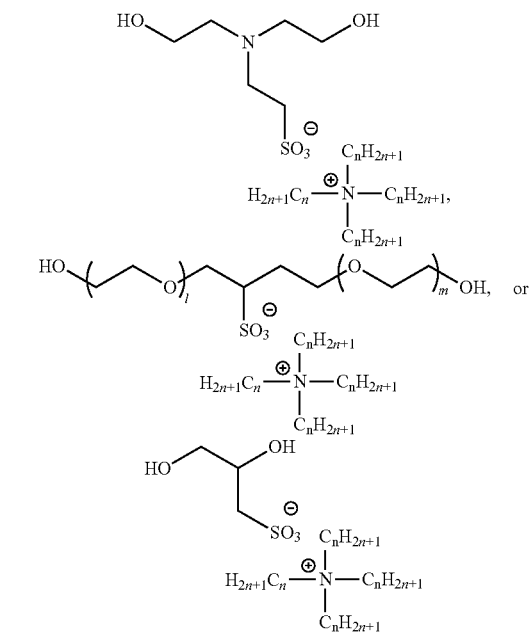

where n is an integer from 1 to 18; 1 is an integer from 1 to 20; m is an integer from 1 to 20; and the nitrogen atom of the quaternary ammonium cation contains no more than three methyl side groups.

In one or more embodiments, the method of the present invention includes any one or more of the above referenced embodiments of the third aspect of the present invention wherein the step of preparing an ionic monomer further comprises: dissolving a chloride, bromide, or iodide salt of a quaternary ammonium compound in a suitable solvent; passing the chloride, bromide, or iodide salt of a quaternary ammonium compound through a hydroxide exchange column to exchange the chloride, bromide, or iodide anions for hydroxide anions, thereby forming a solution containing the hydroxide salt of the quaternary ammonium compound; and adding a sulfonic acid containing diol or polyol to the solution containing the hydroxide salt of the quaternary ammonium to form an ionic monomer comprising a sulfonate containing diol or polyol anion and a quaternary ammonium cation.

In one or more embodiments, the method of the present invention includes any one or more of the above referenced embodiments of the third aspect of the present invention wherein the suitable solvent for dissolving the chloride, bromide, or iodide salt of a quaternary ammonium compound is selected from the group consisting of water, methanol and water, ethanol, propanol, ethanol, propanol, isopropanol, and combinations thereof.

In one or more embodiments, the method of the present invention includes any one or more of the above referenced embodiments of the third aspect of the present invention wherein the step of reacting a diisocyanate with one or more linear polyol or diol to form an isocyanate-terminated prepolymer further comprises: dissolving the one or more linear polyol diol in a suitable solvent or miscible combination of solvents; placing liquid or melted diisocyanate in a suitable reaction vessel, wherein the melted diisocyanate is melted at a temperature above the melting point, but below the dimerization temperature of the diisocyanate; and adding the diol solution to the melted diisocyanate dropwise over a period of from about 1 minutes to about 15 minutes and then stirring for a period of from about 1 hours to about 3 hours at a temperature of from about 50° C. to about 100° C.; wherein the diols and the diisocyanates react to form a isocyanate-terminated prepolymer comprising the residues of the one or more diols and the diisocyanate.

In one or more embodiments, the method of the present invention includes any one or more of the above referenced embodiments of the third aspect of the present invention wherein the one or more linear polyol or diol is a polyester diol and the suitable solvent is selected from the group consisting of anhydrous tetrahydrofuran (THF), toluene, and dioxane, or the one or more linear polyol or diol is a polycarbonate diol and the suitable solvent is selected from the group consisting of anhydrous N,N-dimethylformamide (DMF), dimethyl sulfoxide (DMSO) dioxane. In one or more embodiments, the method of the present invention includes any one or more of the above referenced embodiments of the third aspect of the present invention wherein the diisocyanate is melted at a temperature of from about 45° C. to about 80° C.

In one or more embodiments, the method of the present invention includes any one or more of the above referenced embodiments of the third aspect of the present invention wherein the step of reacting the ionic monomer with the isocyanate-terminated pre-polymer further comprises: dissolving the ionic monomer and one or more linear polyol or diol in a suitable solvent; adding the ionic monomer/linear polyol solution to the isocyanate-terminated prepolymer solution dropwise over a period of from about 1 minutes to about 15 minutes under an inert atmosphere; and stirring the mixture for a period of from about 2 hours to about 5 hours at a temperature of from about 50° C. to about 100° C. to produce a thermoplastic polyurethane ionomer of the present invention.

In one or more embodiments, the method of the present invention includes any one or more of the above referenced embodiments of the third aspect of the present invention wherein the solvent for dissolving the ionic monomer and one or more linear polyol or diol is selected from the group consisting of tetrahydrofuran (THF), dimethylformamide (DMF), dioxane, toluene, and dimethyl sulfoxide (DMSO).

In one or more embodiments, the method of the present invention includes any one or more of the above referenced embodiments of the third aspect of the present invention wherein the step of adding the ionic monomer/linear polyol solution of further comprises adding a catalyst.

In one or more embodiments, the method of the present invention includes any one or more of the above referenced embodiments of the third aspect of the present invention wherein the method includes a bulk preparation method comprising: preparing a solution containing the ionic monomer, a first diol, and a second diol; adding, in the case of a liquid, or melting and adding, in the case of a solid, a quantity of diisocyanate that is from 1 weight percent to about 10 weight percent in excess of the quantity to be used to form the thermoplastic polyurethane ionomer at a temperature above the melting point, but below the dimerization temperature of the isocyanate; and adding the diisocyanate and a catalyst to the diol solution and stirring it to produce a thermoplastic polyurethane ionomer comprising the residue of the diisocyanate, ionic monomer, first diol, and second diol precursors.

In one or more embodiments, the method of the present invention includes any one or more of the above referenced embodiments of the third aspect of the present invention wherein the first diol is a polycarbonate diol, a polyester diol, polyether or polyamide having a weight average molecular weight of from 500 g/mol to about 10,000 g/mol. In one or more embodiments, the method of the present invention includes any one or more of the above referenced embodiments of the third aspect of the present invention wherein the first diol is a $C_2$-$C_{12}$ linear diol.

In one or more embodiments, the method of the present invention includes any one or more of the above referenced embodiments of the third aspect of the present invention wherein the step of preparing a solution comprises stirring the ionic monomer, the first diol, and the second diol at a temperature ranging from 60° C.-120° C. In one or more embodiments, the method of the present invention includes any one or more of the above referenced embodiments of the third aspect of the present invention wherein the catalyst is selected from the group consisting of stannous octoate, 1,4-diazabicyclo[2.2.2.] octane (DABCO), dibutyltin dilaurate, bismuth octanoate, and UV light. In one or more embodiments, the method of the present invention includes any one or more of the above referenced embodiments of the third aspect of the present invention further comprising curing the thermoplastic polyurethane ionomer by heating it to a temperature of from about 75° C. to about 110° C. for a period of from 1 hour to 72 hours.

BRIEF DESCRIPTION OF THE DRAWINGS

For a more complete understanding of the features and advantages of the present invention, reference is now made to the detailed description of the invention along with the accompanying figures in which.

(PE)-4.7TH (FIG. 21B), and TPU30(PE)-4.1TD (FIG. 21C): E' (■), E" (●), and tan δ (▲) are plotted as a function of temperature.

Figure 22:
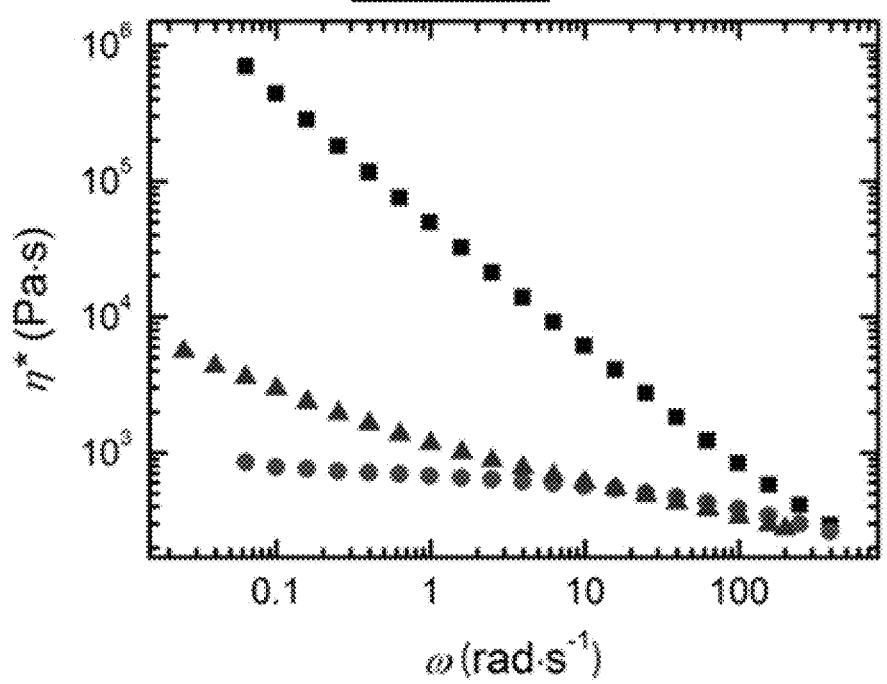

FIG. 22 is a graph showing frequency dependence of the complex viscosity (η*) at 140° C. for TPU30(PE) (■), TPU30(PE)-4.7TH (●), and TPU30(PE)-4.1TD (▲). This series of non-ionic TPU and ionomers possess similar hard segment concentration of nominally 30 wt %.

DETAILED DESCRIPTION OF THE ILLUSTRATIVE EMBODIMENTS

Figure 1:
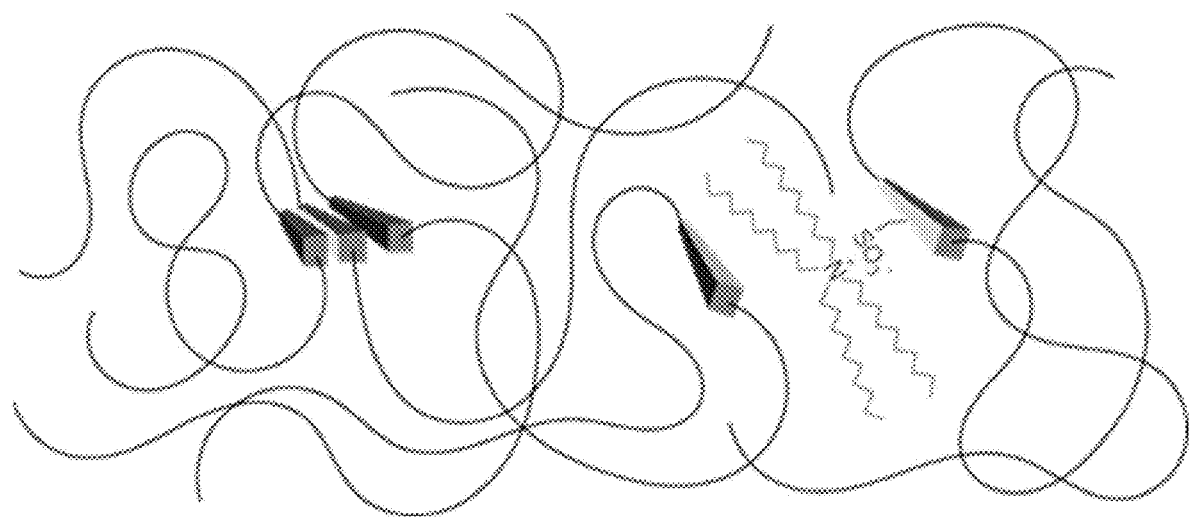
FIG. 1 is a schematic illustration representing the plasticization of TPU using bonded sulfonate groups with bulky quaternary ammonium counterions. The rectangular portions represent hard segments, while the black lines represent the soft segments. The bis-hydroxyl functionality of the BES-ammonium monomer directs its placement into the hard segment, where it disrupts the polar interactions and crystallinity of the hard segments and softens the TPU.

In various embodiments, the present invention relates to a novel approach to the addition of plasticizers for softening TPUs, i.e., lowering the durometer and the melt viscosity. This approach involves incorporating bonded sulfonate groups with quaternary ammonium counterions into the TPU, as illustrated in FIG. 1. In one or more embodiments of the present invention, the softening of TPU is achieved by incorporating an ionic diol, such as N,N-bis (2-hydroxyethyl)-2-aminoethane-sulfonic acid (BES), coupled with various bulky alkyl ammonium cations, during the chain extension step of the TPU synthesis. It is believed that that steric hindrance of the bulky quaternary ammonium groups weakens the dipole-dipole interactions of the sulfonate groups and/or lowers the crystallinity of the hard block, thereby creating additional free volume that softens the polymer and lowers the melt viscosity. Unlike prior art methods for softening TPUs with conventional low molecular weight plasticizers that can diffuse out of the polymer, the ammonium counterions in these compositions have been found to be non-fugitive and non-extractable, presumably because of the strong Coulombic interactions with the fixed counterion and the large enthalpic penalty that would accrue if two free ions were created in the non-polar continuous phase.

Various embodiments of the present invention make it is possible to develop a family of TPUs with varying durometer hardness using a single ionic diol concentration, simply by varying the cation used. For example, hard cations, such as metal ions, may be incorporated in order to promote strong intermolecular attractive interactions between polymer chains that would harden the TPU. In some embodiments, the amount of hardness may also be tuned by altering the size and/or the charge of the cation, thereby influencing the Coulomb energy of the ion-pair and the functionality of the physical crosslinks that arise from the supramolecular bonds. Conversely, in some other embodiments, soft ions (e.g., bulky quaternary ammonium counterions) may be used to develop a softer TPU, and the degree of softening may be controlled by altering the length of the alkyl chain(s) or number of alkyl chains on the ammonium ion. These embodiments offer the advantages of internal plasticization by the addition of bulky monomers, yet reduce the synthetic burden required to formulate a series of soft TPUs.

Moreover, the TPU ionomers provide the softness necessary for processing without significantly affecting the characteristics of the finished TPU polymer. It is believed that when the TPU ionomers of the present invention are formed, the bulky quaternary ammonium counterions slow down the crystallization of the hard segments, allowing the TPU to remain soft long enough for processing, but as the hard segments continue to crystallize, these bulky quaternary ammonium counterions are pushed to interface between the hard and soft segments, where they have little effect on the properties of the final TPU. That being said, it also appears that the quaternary ammonium counterions have some effect on the ability of the hard segments to fully crystallize, producing a final TPU ionomer that is somewhat softer and has a lower melt transition temperature.

In one or more embodiments, the TPU ionomers of the present invention comprise the residue of one or more diisocyanates, one or more polyester, polycarbonate, polyether or polyamide long chain diols having a weight average molecular weight of from 500 g/mol to about 10,000 g/mol; a $C_2$ to $C_{12}$ short chain diol; and an ionic monomer. In one or more embodiments, the diisocyanate residue on the thermoplastic polyurethane ionomers of the present invention may be residues of 4,4'-methylenebis(phenyl isocyanate) (MDI), isophorone diisocyanate (IPDI), and tolylene-2,4-diisocyanate (TDI). In some other embodiments, the thermoplastic polyurethane ionomers of the present invention may also include residues of 1,12-diisocyanatododecane, 1,8-diisocyanatooctane, 1,6-diisocyanatohexane, 1,5-diisocyanatopentane, 1,4-diisocyanatobutane, 1,3-bis (isocyanatomethyl)cyclohexane, individual isomers or mixtures of isomers of 4,4'-methylenebis(cyclohexyl isocyanate) 1,3-phenylene diisocyanate, and tolylene-2,6-diisocyanate, or isomers and combinations thereof.

As set forth above, the thermoplastic polyurethane ionomers of the present invention comprise the residue of one or more a polyester, polycarbonate, polyether, or polyamide long chain diol having a weight average molecular weight of from 500 g/mol to about 10,000 g/mol. In one or more embodiment, the thermoplastic polyurethane ionomers of the present invention comprise the residue of one or more a polyester, polycarbonate, polyether, or polyamide diol having a weight average molecular weight of 750 g/mol or more. In some other embodiments, the thermoplastic polyurethane ionomers may comprise the residue of one or more a polyester, polycarbonate, polyether or polyamide diol having a weight average molecular weight of 1000 g/mol or more, in some embodiments, a weight average molecular weight of 1250 g/mol or more, in some embodiments, a weight average molecular weight of 1500 g/mol or more, in some embodiments, a weight average molecular weight of 2000 g/mol or more, in some embodiments, a weight average molecular weight of 3000 g/mol or more, and in some embodiments, a weight average molecular weight of 4000 g/mol or more. In some other embodiments, the thermoplastic polyurethane ionomers may comprise the residue of one or more a polyester, polycarbonate, polyether or polyamide diol having a weight average molecular weight of 9000 g/mol or less, in some embodiments, a weight average molecular weight of 8000 g/mol or less, in some embodiments, a weight average molecular weight of 7000 g/mol or less, in some embodiments, a weight average molecular weight of 6000 or less, in some embodiments, a weight average molecular weight of 5000 g/mol or less, in some embodiments, a weight average molecular weight of 4000 g/mol or less, and in some embodiments, a weight average molecular weight of 3000 g/mol or less.

Unless otherwise indicated herein, the weight average molecular mass ($M_W$) of a material may be determined using any appropriate method, including without limitation, size exclusion chromatography (SEC), mass spectroscopy, light scattering, osmometry, and intrinsic viscosity. In one or more embodiments, the $M_W$ of the polyester, polycarbonate, polyether or polyamide long chain diols may be measured by SEC.

Suitable polyester diols may include, without limitation, polyalkylene succinates, polyalkylene adipates, polyalkylene terephthalates, polycaprolactones.

Suitable polycarbonate diols may include, without limitation, polyhexamethylene carbonate.

Suitable polyether diols may include, without limitation, polytetramethylene oxide, polyoxyalkylene polyols prepared for cyclic alkylene oxides including ethylene oxide, propylene oxide, butylene oxide, styrene oxide, and mixtures thereof. The polyoxyalkylene oxides may be prepared from any of the above alkylene oxides alone, or in combination with one another. When prepared from mixtures of alkylene oxides, the resulting copolymers may be random or block copolymers.

Suitable polyamide diols may include, without limitation, poly(ether-b-amide).

In one or more embodiments, the thermoplastic polyurethane ionomer of the present invention may include the residue of a diol having a formula:

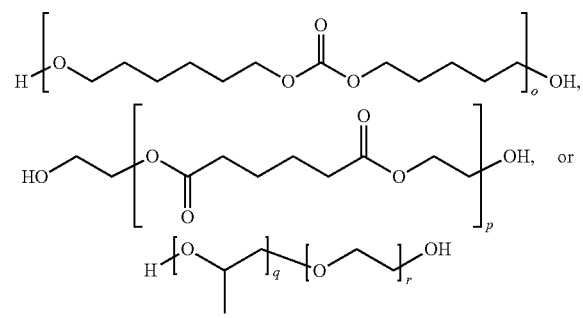

where o is an integer from about 1 to about 1000; p is an integer from about 1 to about 1000; q is an integer from about 1 to about 500; and r is an integer from about 1 to about 500.

In some of these embodiments, o may be an integer of 50 or more. In other embodiments, o may be an integer from 100 or more, in other embodiments, 500 or more, in other embodiments, 1000 or more, in other embodiments, 2000 or more, in other embodiments, 3000 or more, and in other embodiments, 4000 or more. In some of these embodiments, o may be an integer of 900 or less. In other embodiments, o may be an integer from 800 or less, in other embodiments, 750 or less, in other embodiments, 700 or less, in other embodiments, 650 or less, in other embodiments, 600 or less, in other embodiments, 500 or less, and in other embodiments, 450 or less. In some of these embodiments, p may be an integer of 50 or more. In other embodiments, p may be an integer from 100 or more, in other embodiments, 500 or more, in other embodiments, 1000 or more, in other embodiments, 2000 or more, in other embodiments, 3000 or more, and in other embodiments, 4000 or more. In some of these embodiments, p may be an integer of 900 or less. In other embodiments, p may be an integer from 800 or less, in other embodiments, 700 or less, in other embodiments, 600 or less, in other embodiments, 500 or less, in other embodiments, 450 or less, in other embodiments, 400 or less, and in other embodiments, 350 or less.

In some of these embodiments, q may be an integer of 50 or more. In other embodiments, q may be an integer from 100 or more, in other embodiments, 150 or more, in other embodiments, 200 or more, in other embodiments, 250 or more, in other embodiments, 300 or more, and in other embodiments, 400 or more. In some of these embodiments, q may be an integer of 400 or less. In other embodiments, q may be an integer from 350 or less, in other embodiments, 300 or less, in other embodiments, 250 or less, in other embodiments, 200 or less, in other embodiments, 150 or less, and in other embodiments, 100 or less. In some of these embodiments, r may be an integer of 50 or more. In other embodiments, r may be an integer from 100 or more, in other embodiments, 150 or more, in other embodiments, 200 or more, in other embodiments, 250 or more, in other embodiments, 300 or more, and in other embodiments, 350 or more. In some of these embodiments, r may be an integer of 400 or less. In other embodiments, r may be an integer from 350 or less, in other embodiments, 300 or less, in other embodiments, 250 or less, in other embodiments, 200 or less, in other embodiments, 150 or less and in other embodiments, 100 or less.

As set forth above, in various embodiments, the thermoplastic polyurethane ionomers of the present invention include the residue of an ionic monomer formed of a sulfonate containing diol anion and a quaternary ammonium counterion, that been covalently bonded with one or more diisocyanates to form the backbone of a thermoplastic polyurethane ionomer. The sulfonate containing polyol ion not only provides the two hydroxyl functional groups necessary to bond with the diisocyanate compounds to form the TPU, it also provides sufficient sulfonate functionality necessary to form an ion complex with a quaternary ammonium counterion. The sulfonate containing polyol ion residue is not particularly limited and may be the residue of any diol or polyol monomer having sulfonate functionality that is capable of simultaneously bonding with the diisocyanates and complexing with a quaternary ammonium counterion.

In some embodiments, the sulfonic acid containing polyol anion forming part of the ionic monomer residue of the TPUs of the present invention may contain the residue of N,N-bis(2-hydroxyethyl)-2-aminoethane-sulfonic acid (BES), N,N-bis(2-hydroxypropyl)-2-aminoethane-sulfonic acid, or N,N-bis (2-hydroxybutyl)-2-aminoethane-sulfonic acid.

In some embodiments, the ionic monomer residue of the TPUs of the present invention may contain the residue of a sulfonate containing diol anion having the formula:

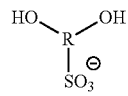

where R is a hydrocarbon or oligomeric polyether, and possesses either a tertiary carbon or nitrogen atom to afford the sulfonated side chain. In some other embodiments, ionic monomer residue may contain the residue of a sulfonate containing diol anion having the formula:

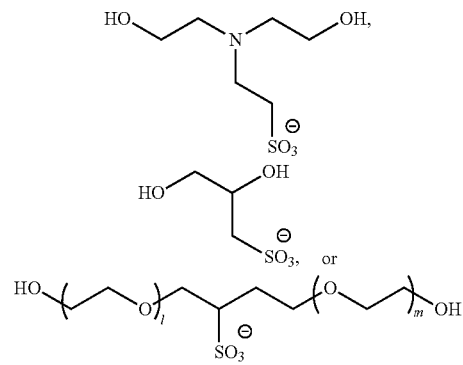

where l is an integer from 1 to 20; and m is an integer from 1 to 20. In some of these embodiments, l may be an integer of 2 or more. In other embodiments, l may be an integer from 4 or more, in other embodiments, 6 or more, in other embodiments, 8 or more, in other embodiments, 10 or more, in other embodiments, 12 or more, and in other embodiments, 14 or more. In some of these embodiments, l may be an integer of 18 or less. In other embodiments, l may be an integer from 16 or less, in other embodiments, 14 or less, in other embodiments, 12 or less, in other embodiments, 10 or less, in other embodiments, 8 or less, in other embodiments, 6 or less, and in other embodiments, 4 or less.

In some of these embodiments, m may be an integer of 2 or more. In other embodiments, m may be an integer from 4 or more, in other embodiments, 6 or more, in other embodiments, 8 or more, in other embodiments, 10 or more, in other embodiments, 12 or more, and in other embodiments, 14 or more. In some of these embodiments, m may be an integer of 18 or less. In other embodiments, m may be an integer from 16 or less, in other embodiments, 14 or less, in other embodiments, 12 or less, in other embodiments, 10 or less, in other embodiments, 8 or less, in other embodiments, 6 or less, and in other embodiments, 4 or less.

As set forth above, forming a complex with the sulfonate containing diol anion is a quaternary ammonium counterion. In various embodiments, the quaternary ammonium counterion may have the formula:

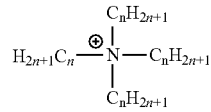

wherein n is an integer from 1 to 18 with the proviso that no more than three of the four $C_nH_{2n+1}$ side groups on the quaternary ammonium counterion can be methyl groups (n=1). Suitable quaternary ammonium counterion may include, without limitation, didodecyldimethylammonium (DDA), tetrahexylammonium (THA), terakis (decyl) ammonium (TDA), trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis (decyl) ammonium, tetraoctylammonium, tetraheptylammonium, tetrahexylammonium, tetrabutylammonium, and combinations thereof.

As set forth above, a sulfonic acid containing polyol or diol and a quaternary ammonium hydroxide join to form the ionic monomer. In one or more embodiments, the ionic monomer residue of the TPUs of the present invention may have the general formula:

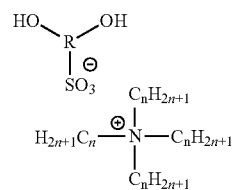

wherein R is a hydrocarbon or oligomeric polyether, and possesses either a tertiary carbon or nitrogen atom to afford the sulfonated side chain; n is an integer from 1 to 18; and the nitrogen atom of the quaternary ammonium counterion contains no more than three methyl side groups. In some embodiments, the ionic monomer residue of the TPUs of the present invention may have the formula:

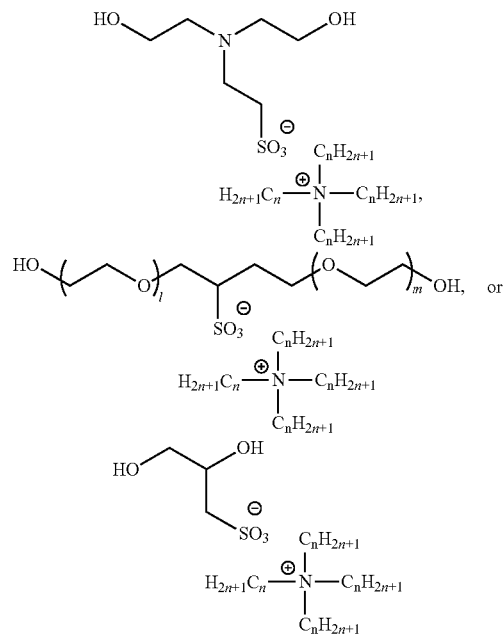

where l is an integer from 1 to 20; m is an integer from 1 to 20; n is an integer from 1 to 18; and the nitrogen atom of the quaternary ammonium counterion contains no more than three methyl side groups.

In some of these embodiments, l may be an integer of 2 or more. In other embodiments, l may be an integer from 4 or more, in other embodiments, 6 or more, in other embodiments, 8 or more, in other embodiments, 10 or more, in other embodiments, 12 or more, and in other embodiments, 14 or more. In some of these embodiments, l may be an integer of 18 or less. In other embodiments, l may be an integer from 16 or less, in other embodiments, 14 or less, in other embodiments, 12 or less, in other embodiments, 10 or less, in other embodiments, 8 or less, in other embodiments, 6 or less, and in other embodiments, 4 or less.

In some of these embodiments, m may be an integer of 2 or more. In other embodiments, m may be an integer from 4 or more, in other embodiments, 6 or more, in other embodiments, 8 or more, in other embodiments, 10 or more, in other embodiments, 12 or more, and in other embodiments, 14 or more. In some of these embodiments, m may be an integer of 18 or less. In other embodiments, m may be an integer from 16 or less, in other embodiments, 14 or less, in other embodiments, 12 or less, in other embodiments, 10 or less, in other embodiments, 8 or less, in other embodiments, 6 or less, and in other embodiments, 4 or less.

As set forth above, in various embodiments, the thermoplastic polyurethane ionomers of the present invention include the residue of a $C_2$ to $C_{12}$ diol. In some embodiments, the $C_2$ to $C_{12}$ diol acts as a chain extender. The $C_2$ to $C_{12}$ diol is not particularly limited and may be the residue of any linear $C_2$ to $C_{12}$ diol including, without limitation, 1,4-butanediol (BDO), ethylene glycol, 1,3-propanediol, 1,4-butanediol, 1,6-hexanediol, 1,8-octanediol, 1,10-decanediol, 1,12-dodecanediol, and combinations thereof.

In various embodiments, the thermoplastic polyurethane ionomer of the present invention may have the general formula:

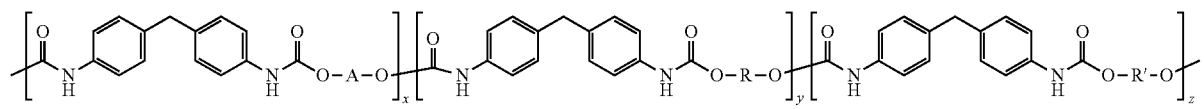

wherein A is the residue of a polyester, polycarbonate, polyether polyamide diol having a weight average molecular weight of from 500 g/mol to about 10,000 g/mol, as described above; R is the residue of an ionic monomer comprising sulfonate containing diol ion and a quaternary ammonium counterion, as described above; R' is a residue of a $C_2$ to $C_{12}$ diol, as described above; x is a mole fraction from about 0.005 to about 0.8; y is a mole fraction from about 0.005 to about 0.8; and z is mole fraction from about 0.005 to about 0.9.

In one or more embodiments, x may be a mole fraction of 0.01 or more. In other embodiments, x may be a mole fraction of 0.05 or more, in other embodiments, 0.1 or more, in other embodiments, 0.1 or more, in other embodiments, 0.3 or more, in other embodiments, 0.4 or more, and in other embodiments, 0.5 or more. In one or more embodiments, x may be a mole fraction of 0.7 or less. In other embodiments, x may be a mole fraction of 0.6 or less, in other embodiments, 0.5 or less, in other embodiments, 0.4 or less, in other embodiments, 0.35 or less, in other embodiments, 0.3 or less, in other embodiments, 0.2 or less, in other embodiments, 0.1 or less, and in other embodiments, 0.05 or less.

In one or more embodiments, y may be a mole fraction of 0.01 or more. In other embodiments, y may be a mole fraction of 0.1 or more, in other embodiments, 0.2 or more, in other embodiments, 0.3 or more, in other embodiments, 0.4 or more, in other embodiments, 0.5 or more, and in other embodiments, 0.6 or more. In one or more embodiments, y may be a mole fraction of 0.7 or less. In other embodiments, y may be a mole fraction of 0.6 or less, in other embodiments, 0.5 or less, in other embodiments, 0.4 or less, in other embodiments, 0.3 or less, in other embodiments, 0.2 or less, in other embodiments, 0.1 or less and in other embodiments, 0.05 or less. In one or more embodiments, z may be a mole fraction of 0.01 or more. In other embodiments, z may be a mole fraction of 0.05 or more, in other embodiments, 0.1 or more, in other embodiments, 0.2 or more, in other embodiments, 0.3 or more, in other embodiments, 0.4 or more, and in other embodiments, 0.5 or more. In one or more embodiments, z may be a mole fraction of 0.8 or less. In other embodiments, z may be a mole fraction of 0.7 or less, in other embodiments, 0.6 or less, in other embodiments, 0.5 or less, in other embodiments, 0.4 or less, in other embodi-ments, 0.2 or less, and in other embodiments, 0.1 or less. In applications where a more rigid TPU is desired z may be a mole fraction of about 0.95.

In various embodiments, the residue of the quaternary ammonium counterions described above comprise from about 0.5 weight % to about 30 weight % of TPU ionomer of the present invention. In one or more embodiments, the quaternary ammonium counterions comprise 0.1 weight % or more of the TPU ionomer of the present invention. In other embodiments, the quaternary ammonium counterions comprise 0.5 weight % or more, in some embodiments, 1.0 weight % or more, in some embodiments, 5.0 weight % or more, in some embodiments, 10.0 weight % or more, in some embodiments, 15.0 weight % or more, and in some embodiments, 20.0 weight % or more of TPU ionomer of the present invention. In one or more embodiments, the quaternary ammonium counterions comprise 25.0 weight % or less of the TPU ionomer of the present invention. In other embodiments, the quaternary ammonium counterions comprise 20.0 weight % or less, in some embodiments, 17.0 weight % or less, in some embodiments, 13.0 weight % or less, in some embodiments, 10.0 weight % or less, in some embodiments, 7.0 weight % or less, and in some embodiments, 5.0 weight % or less of TPU ionomer of the present invention.

In various embodiments, the TPU ionomer of the present invention has a Shore A durometer hardness of from about 20 to about 100. In some embodiments, the TPU ionomer of the present invention has a Shore A durometer hardness of 25 or more. In other embodiments, the TPU ionomer of the present invention may have a Shore A durometer hardness of 30 or more, in other embodiments, 40 or more, in other embodiments, 50 or more, in other embodiments, 60 or more, in other embodiments, 70 or more, in other embodiments, 80 or more, and in other embodiments, 90 or more. In some embodiments, the TPU ionomer of the present invention has a Shore A durometer hardness of 90 or less. In other embodiments, the TPU ionomer of the present invention may have a Shore A durometer hardness of 80 or less, in other embodiments, 70 or less, in other embodiments, 60 or less, in other embodiments, 50 or less, in other embodiments, 40 or less, in other embodiments, 30 or less, and in other embodiments, 25 or less.

In various embodiments, the residue of the ionic monomers described above comprise from about 0.5 weight % to about 30.0 weight % of the TPU ionomer of the present invention. In one or more embodiments, the residue of the ionic monomers comprise 1.0 weight % or more of the TPU ionomer of the present invention. In other embodiments, the residue of the ionic monomers comprise 5.0 weight % or more, in some embodiments, 10.0 weight % or more, in some embodiments, 15.0 weight % or more, in some embodiments, 18.0 weight % or more, in some embodiments, 20.0 weight % or more, and in some embodiments, 25.0 weight % or more of TPU ionomer of the present invention. In one or more embodiments, the residue of the ionic monomers comprise 25.0 weight % or less of the TPU ionomer of the present invention. In other embodiments, the residue of the ionic monomers comprise 20.0 weight % or less, in some embodiments, 18.0 weight % or less, in some embodiments, 15.0 weight % or less, in some embodiments, 10.0 weight % or less, in some embodiments, 5.0 weight % or less, and in some embodiments, 3.0 weight % or less of TPU ionomer of the present invention.

As should be apparent, the glass transition temperature of the TPU ionomers of the present invention will vary greatly depending upon the choice of long chain diol. In various embodiments, the TPU ionomer of the present invention has a $T_g$ of from about −150° C. to about 75° C. In one or more embodiments, the TPU ionomer of the present invention may have a $T_g$ of −140 or more. In other embodiments, the TPU ionomer of the present invention may have a $T_g$ of −125 or more, in other embodiments, −100 or more, in other embodiments, −75 or more, in other embodiments, −25 or more, in other embodiments, 5 or more, in other embodiments, 15 or more, and in other embodiments, 15 or more. In one or more embodiments, the TPU ionomer of the present invention may have a $T_g$ of 50 or less. In other embodiments, the TPU ionomer of the present invention may have a $T_g$ of 25 or less, in other embodiments, 0 or less, in other embodiments, −25 or less, in other embodiments, −50 or less, in other embodiments, −75 or less, in other embodiments, −100 or less, and in other embodiments, −125 or less.

In various embodiments, the TPU ionomers of the present invention have a weight average molecular weight of from about 5,000 Da to about 2,000,000 Da. In some embodiments, the TPU ionomers of the present invention have a weight average molecular weight of 10,000 Da or more. In other embodiments, the TPU ionomers of the present invention have a weight average molecular weight of 50,000 Da or more, in other embodiments, 100,000 Da or more, in other embodiments, 500,000 Da or more, in other embodiments, 750,000 Da or more, in other embodiments, 1,000,000 Da or more, in other embodiments, 1,250,000 Da or more, and in other embodiments, 1,500,000 Da or more. In some embodiments, the TPU ionomers of the present invention have a weight average molecular weight of 1,750.000 Da or less. In other embodiments, the TPU ionomers of the present invention have a weight average molecular weight of 1,500,000 Da or less, in other embodiments, 1,250,000 Da or less, in other embodiments, 1,000,000 Da or less, in other embodiments, 750,000 Da or less, in other embodiments, 500,000 Da or less, in other embodiments, 300,000 Da or less, and in other embodiments, 100,000 Da or less.

In a second aspect, various embodiments of the present invention are directed to a chain extender for use in softening thermoplastic polyurethanes for processing containing a sulfonate containing diol or polyol anion and an quaternary ammonium cation, as set forth above. In various embodiments, the chain extender for use in softening thermoplastic polyurethanes of the present invention may be any of the ionic monomers identified and described above. In one or more embodiments, sulfonate containing diol or polyol anion may be any of those described above, including without limitation N,N-bis(2-hydroxyethyl)-2-aminoethane-sulfonic acid (BES), N,N-bis(2-hydroxypropyl)-2-amino-ethane-sulfonic acid, or N,N-bis(2-hydroxybutyl)-2-amino-ethane-sulfonic acid.

Similarly, the quaternary ammonium cation may be any of the quaternary ammonium counterions identified and described above, including without limitation, didodecyldi-methylammonium (DDA) cation, a tetrahexylammonium (THA) cation, a terakis (decyl) ammonium (TDA) cation, trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis (decyl) ammonium, tetraoctylammonium, tetraheptylammonium, tetrahexylammonium, tetrabutylammonium, and combinations thereof.

In one or more embodiments, the chain extender for use in softening thermoplastic polyurethanes for processing may have the general formula:

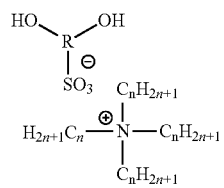

where R is a hydrocarbon or oligomeric polyether, and possesses either a tertiary carbon or nitrogen atom to afford the sulfonated side chain; n is an integer from 1 to 18; and the nitrogen atom of the quaternary ammonium cation contains no more than three methyl side groups. In some embodiments, the chain extender for use in softening thermoplastic polyurethanes of the present invention may have the formula:

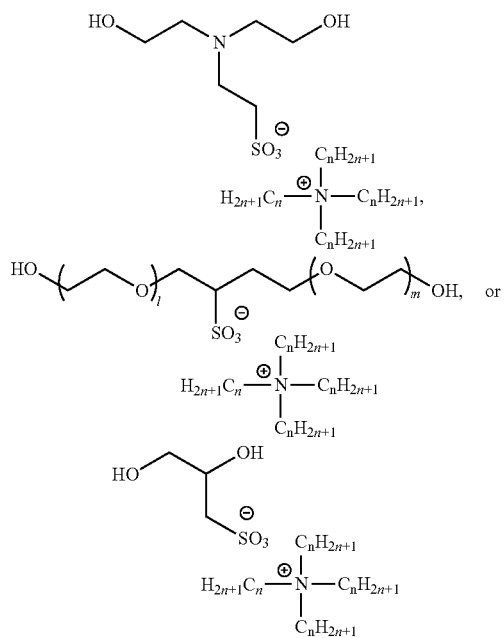

where l is an integer from 1 to 20; m is an integer from 1 to 20; n is an integer from 1 to 18; and the nitrogen atom of the quaternary ammonium counterion contains no more than three methyl side groups.

In a third aspect, various embodiments of the present invention are directed to a method of making the thermoplastic polyurethane ionomer described above. In one or more embodiment, the method begins with preparing an ionic monomer comprising a sulfonate containing diol or polyol anion and a quaternary ammonium cation, as described above. In these embodiments, sulfonate containing diol or polyol anion may be any of those identified and described above including, without limitation, N,N-bis(2-hydroxyethyl)-2-aminoethane-sulfonic acid (BES), N,N-bis (2-hydroxypropyl)-2-aminoethane-sulfonic acid, or N,N-bis (2-hydroxybutyl)-2-aminoethane-sulfonic acid. The quaternary ammonium cations (counterions) may be any of those identified and described above, which may be synthesized using any suitable method and are commercially available from, for example, Sigma Aldrich (St. Louis, Mo.) In one or more embodiments, quaternary ammonium cation may be, without limitation, a didodecyldimethylammonium (DDA) cation, a tetrahexylammonium (THA) cation, a terakis(decyl)ammonium (TDA) cation, trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis(decyl) ammonium, tetraoctylammonium, tetraheptylammonium, tetrahexylammonium, tetrabutylammonium, or a combination thereof.

In some embodiments, this process begins by preparing the quaternary ammonium cations (counterions) from their bromiated, iodinated, or chlorinated counterparts. In one or more of these embodiments, the chloride, bromide, or iodide salt of the quaternary ammonium compound in first dissolved in a suitable solvent. One of ordinary skill in the art will be able to select a suitable solvent without undue experimentation. In one or more embodiments, suitable solvents may include without limitation, water, methanol, ethanol, propanol, isopropanol, or combinations thereof. The solution containing the chloride, bromide, or iodide salt of the desired quaternary ammonium compound is then passed through a hydroxide exchange column to exchange the chloride, bromide, or iodide anions for hydroxide anions, thereby forming a solution containing the hydroxide salt of the desired quaternary ammonium compound. Suitable hydroxide exchange columns are well known in the art and suitable example may include a hydroxide exchange column packed with Amberlite® IRN-78 exchange resin (Rohm and Haas Company, Philadelphia, Pa.). Next, the sulfonate containing diol or polyol anion described above is added to the solution containing the hydroxide salt of the desired quaternary ammonium to form the desired ionic monomer having a sulfonate containing diol anion and a quaternary ammonium cation. In one or more embodiments, the ionic monomer may be synthesized as set forth in Example 1 below.

In one or more embodiments, the ionic monomer used to form the TPU ionomers of the present invention may be any of the ionic monomers described above. In some embodiments, the ionic monomers may have the formula:

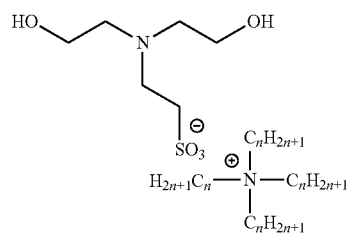

where n is an integer from 1 to 18; and the nitrogen atom of the quaternary ammonium cation contains no more than three methyl side groups. As can be seen, the ionic monomers of various embodiments of the present invention will have at least two functional hydroxyl groups for bonding and a quaternary ammonium cation complexed to the sulfonate functional group of the sulfonic acid containing polyol.

Next, in these embodiments, at least one suitable diisocyanate is selected and reacted with one or more long chain diol or linear polyol in a separate vessel to form a polyurethane pre-polymer. Suitable long chain diols or linear polyols may include any of the long chain diols described above and includes any polyester, polycarbonate, polyether, or polyamide long chain diol having a weight average molecular weight of from 500 g/mol to about 10,000 g/mol. In some embodiments, the long chain diol or linear polyol may have a formula:

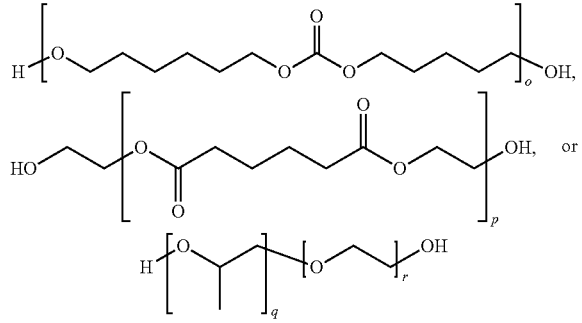

where o is an integer from about 1 to about 1000; p is an integer from about 1 to about 1000; q is an integer from about 1 to about 500; and r is an integer from about 1 to about 500.

As set forth above, suitable diisocyanates may include 4,4'-methylenebis(phenyl isocyanate) (MDI), isophorone diisocyanate (IPDI), and tolylene-2,4-diisocyanate (TDI). In some other embodiments, additional aliphatic diisocyanates including, but not limited to, 1,12-diisocyanatododecane, 1,8-diisocyanatooctane, 1,6-diisocyanatohexane, 1,5-diisocyanatopentane, 1,4-diisocyanatobutane, 1,3-bis(isocyanatomethyl)cyclohexane, individual isomers or mixtures of isomers of 4,4'-methylenebis(cyclohexyl isocyanate)1,3-phenylene diisocyanate, and tolylene-2,6-diisocyanate, or isomers and combinations thereof, may also be used.

In one or more embodiment the step of forming a isocyanate-terminated pre-polymer begins with dissolving one or more long chain diol or linear polyol in a suitable solvent or miscible combination of solvents. One of ordinary skill in the art will be able to select a suitable solvent or combinations of solvents without undue experimentation. In embodiments where the long chain diol or linear polyol is a polyester diol, suitable solvents may include, without limitation, anhydrous tetrahydrofuran (THF), toluene, dioxane, or combinations thereof. In embodiments where the long chain diol or linear polyol is a polycarbonate diol, polyether diol, or polyamide diol, suitable solvents may include anhydrous N,N-dimethylformamide (DMF), dimethyl sulfoxide (DMSO) dioxane, N,N-dimethylacetamine (DMAc), or combinations thereof.

As will be apparent to those of ordinary skill in the art, many diisocyanates may be liquids or solids at ambient temperature, depending upon their molecular weight and chemical structure. In embodiments, where the diisocyanate to be used is a liquid at ambient (room) temperature, the liquid diisocyanate may be added directly to a suitable reaction vessel. In embodiments where the diisocyanate to be used is a solid at ambient (room) temperature, the solid diisocyanate must first be melted at a temperature above its melting point, but below its dimerization temperature, before it may be added to the reaction vessel. In one or more of these embodiments, the reaction vessel is a three-neck reaction flask equipped with a condenser, injection port, and mechanical stirrer. Whether liquid or melted, the diisocyanate is added to the reaction vessel under an inert atmosphere to prevent hydrolysis of the diisocyanate.

In one or more embodiments, the solid diisocyanate may be melted at a temperature of from about 45° C. to about 80° C. In one or more of these embodiments, the reaction vessel has been preheated to 65° C. and the diisocyanate was added to the pre-heated reaction flask and purged with dry $N_2$ in order to melt the diisocyanate (MDI), yet the temperature was low enough to limit dimerization. In one or more embodiment, the solid diisocyanate may be melted at a temperature of 48° C. or more. In some other embodiments, the solid diisocyanate may be melted at a temperature of 50° C. or more, in other embodiments, 53° C. or more, in other embodiments, 57° C. or more, in other embodiments, 60° C. or more, in other embodiments, 65° C. or more, and in other embodiments, 70° C. or more. In one or more embodiment, the solid diisocyanate may be melted at a temperature of 77° C. or less. In some other embodiments, the solid diisocyanate may be melted at a temperature of 75° C. or less, in other embodiments, 70° C. or less, in other embodiments, 65° C. or less, in other embodiments, 60° C. or less, in other embodiments, 55° C. or less, and in other embodiments, 60° C. or less.

In these embodiments, the isocyanate-terminated pre-polymer is then formed by slowly adding the long chain diol or linear polyol solution to the reaction vessel containing the liquid or melted diisocyanate over a period of from about 1 minutes to about 15 minutes while stirring, and then continuing to stir for a period of from about 1 hour to about 3 hours at a temperature of from about 50° C. to about 100° C. to form the isocyanate-terminated prepolymer comprising the residues of the one or more diols and the diisocyanate. The slow addition of diol solution allowed for sufficient heat dissipation to control the temperature of the exothermic reaction that produced an isocyanate-terminated pre-polymer. In one or more embodiment, an aliquots may be taken from the reaction solution, and the isocyanate (NCO) concentration measure measured by titration method using ASTM Standard D2572-97, the contents of which are incorporated herein by reference in its entirety. In these embodiments, when the desired isocyanate NCO content was achieved, the pre-polymer is then chain-extended, as described below.

In one or more embodiment, a chain extender solution is prepared dissolving any of the short chain diols identified and discussed above in a suitable solvent. Suitable solvents for the short chain diols may include, without limitation, 1,4-butanediol (BDO), ethylene glycol, 1,3-propanediol, 1,4-butanediol, 1,6-hexanediol, 1,8-octanediol, 1,10-decanediol, 1,12-dodecanediol, and combinations thereof. One of ordinary skill in the art will be able to select a suitable solvent or combinations of solvents for the short chain diols identified and discussed above without undue experimentation. Suitable solvents for the short chain diols identified and discussed above will, of course depend upon the particular short chain diols being used but may include tetrahydrofuran (THF), dimethylformamide (DMF), dioxane, toluene, dimethyl sulfoxide (DMSO), N,N-dimethylacetamine (DMAc), or combinations thereof. Next, this solution is added to the ionic monomer solution described above to form the cross linking solution.

In some embodiments, chain extender solution also contains a catalyst. While some lower molecular weight TPU ionomers according to the present invention may be prepared without a catalyst, use of a catalyst is necessary to obtain TPU ionomers having higher molecular weights. Any suitable catalyst normally used with polyurethanes may be used, including without limitation, stannous octoate, 1,4-diazabicyclo[2.2.2.]octane (DABCO), dibutyltin dilaurate, bismuth octanoate, UV light and combinations thereof.

Finally, to form the TPU ionomers of various embodiments of the present invention, the chain extender solution containing the ionic monomer, short chain diols, optionally, a catalyst, is slowly added under an inert atmosphere to the reaction vessel containing the isocyanate-terminated pre-polymer to form the TPU ionomer of various embodiments of the present invention. In some embodiments, the chain extender solution is added to the isocyanate-terminated pre-polymer over a period of from about 1 minutes to about 15. In some embodiments, the chain extender solution was added dropwise via syringe pump into the reactor over a period of 5 min, with continuous stirring at 250 rpm and $N_2$ purge.

Once the chain extender solution has been added to the isocyanate-terminated pre-polymer, the mixture is stirred for a period of from about 2 hours to about 5 hours at a temperature of from about 50° C. to about 100° C. In some embodiments, the mixture is stirred for from about 3 to about 5 hours. In some embodiments, the mixture is stirred for from about 4 to about 5 hours. In some embodiments, the mixture is stirred for from about 2 to about 4 hours. In some embodiments, the mixture is stirred for from about 3 to about 4 hours. In some embodiments, the mixture is stirred at a temperature of 50° C. or more, in other embodiments, 60° C. or more, in other embodiments, 60° C. or more, and in other embodiments, 70° C. or more. In some embodiments, the mixture is stirred at a temperature of 90° C. or less, in other embodiments, 80° C. or less, in other embodiments, 70° C. or less, and in other embodiments, 65° C. or less. In some of these embodiments, the chain extender solution and isocyanate-terminated pre-polymer are allowed to react for from two to three hours, or until substantially all of the isocyanate functional groups on the isocyanate-terminated pre-polymer have reacted.

The TPU ionomer of the present invention may then be collected and purified using any suitable method known in the art for that purpose. In one or more embodiment, the TPU ionomer may be precipitated into cold methanol and removed by filtration. In some embodiments, the TPU ionomer may then be re-dissolved in minimal amount to THF and precipitated again into diethyl ether and dried in an oven vacuum at 50° C. for 48 h.

In an alternative method, the TPU elastomers of various embodiments of the present invention may be prepared using a bulk method. (See Example 3, below) In these embodiments, an ionic monomers, one or more long chain diol, and one or more short chain diol are combined in a suitable container. The ionic monomer, long chain diols, and short chain diols may be any of those identified and described above. In some embodiments, this ionic monomer/diol mixture may also include a suitable catalyst. Suitable catalysts may include, without limitation, stannous octoate, 1,4-diazabicyclo[2.2.2.]octane (DABCO), dibutyltin dilaurate, bismuth octanoate, UV light and combinations thereof. The ionic monomer/diol mixture is then stirred at a temperature ranging from 60° C. to about 120° C.

To this mixture, a quantity of liquid or melted diisocyanate that is from 1 weight percent to about 10 weight percent in excess of the quantity to be used to form the thermoplastic polyurethane ionomer is prepared in a suitable container and then added to ionic monomer/diol solution. The mixture is then stirred to produce a TPU ionomer comprising the residue of the diisocyanate, the ionic monomer, the long chain diol(s), and the short chain diol(s). The excess quantity of diisocyanate is intended to compensate for the quantity of diisocyanate lost in the transfer from the first container into the vessel containing the ionic monomer/diol solution.

In some embodiments, the TPU ionomers of the present invention may be heated in an oven at a temperature of from about 75° C. to about 110° C. for a period of from 1 hour to 72 hours to increase their molecular weight.

EXPERIMENTAL

To better understand and further reduce various embodiments of the present invention to practice, ionic monomers, TPUs and ionic TPUs according to one or more embodiment of the present invention were characterized and their hardness, thermal, mechanical and viscoelastic properties evaluated.

1. Characterization of Ionic Monomers.

Figure 2:
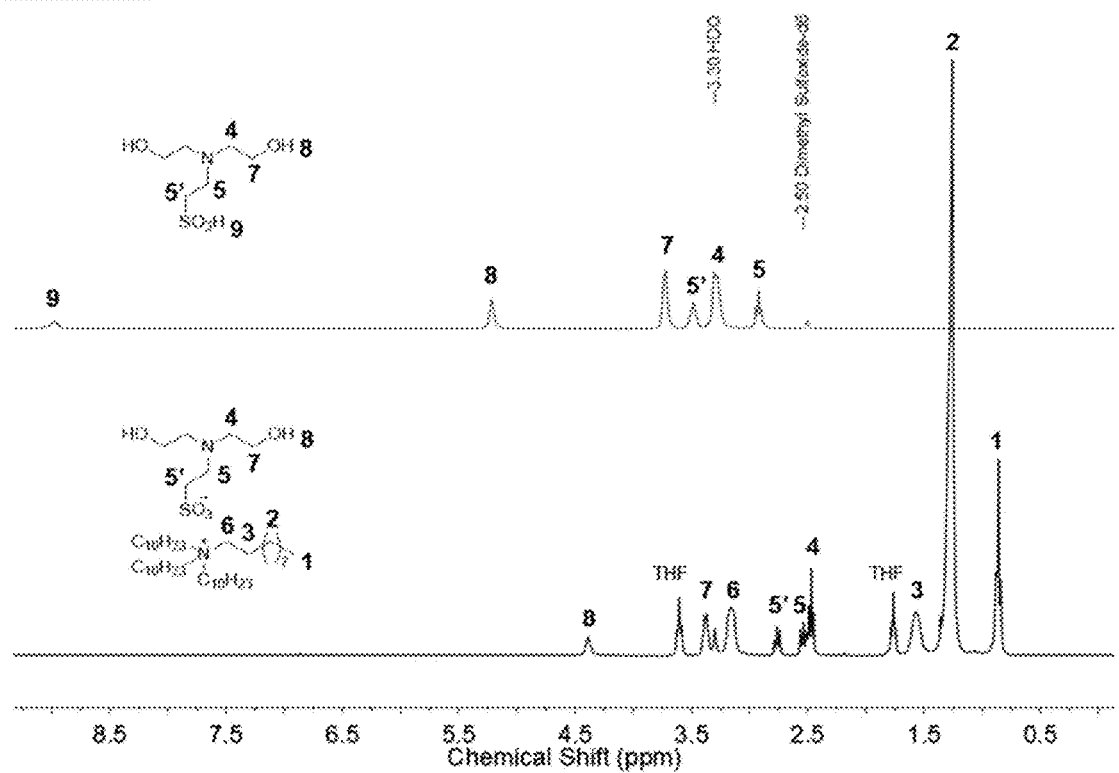
FIG. 2 is a $^1$H-NMR overlay for BES (upper) and terakis(decyl)ammonium (TDA)/BES ionic monomer (TDA-BES) (lower). A comparison of these spectra reveals that all of the peaks from BES (4, 5, 5', 7, and 8) demonstrate a notable upfield shift as a result of the coupling. In addition, the disappearance of the sulfonate proton (peak 9) provides further evidence of successful conversion. It should be noted that peaks 4 and 5 in the TDA-BES spectrum overlap with the DMSO-d$_6$ residual solvent peak.

$^1$H-NMR was used to confirm the purity and successful syntheses of the TDA-BES, DDA-BES and THA-BES ionic monomers was confirmed by $^1$H-NMR. FIG. 2, for example, is a spectral overlay of $^1$H-NMR spectra for BES (upper) and TDA-BES (lower). The comparison of these spectra makes plain a notable upfield shift for each peak belonging to BES (4, 5, 5', 7, and 8) as a result of its coupling with the alkyl ammonium counterion (TDA). In addition, the disappearance of the sulfonate proton (peak 9) provides further evidence of successful conversion. It should be noted that peaks 4 and 5 in the TDA-BES spectrum overlap with the DMSO-d$_6$ residual solvent peak.

Figure 3:
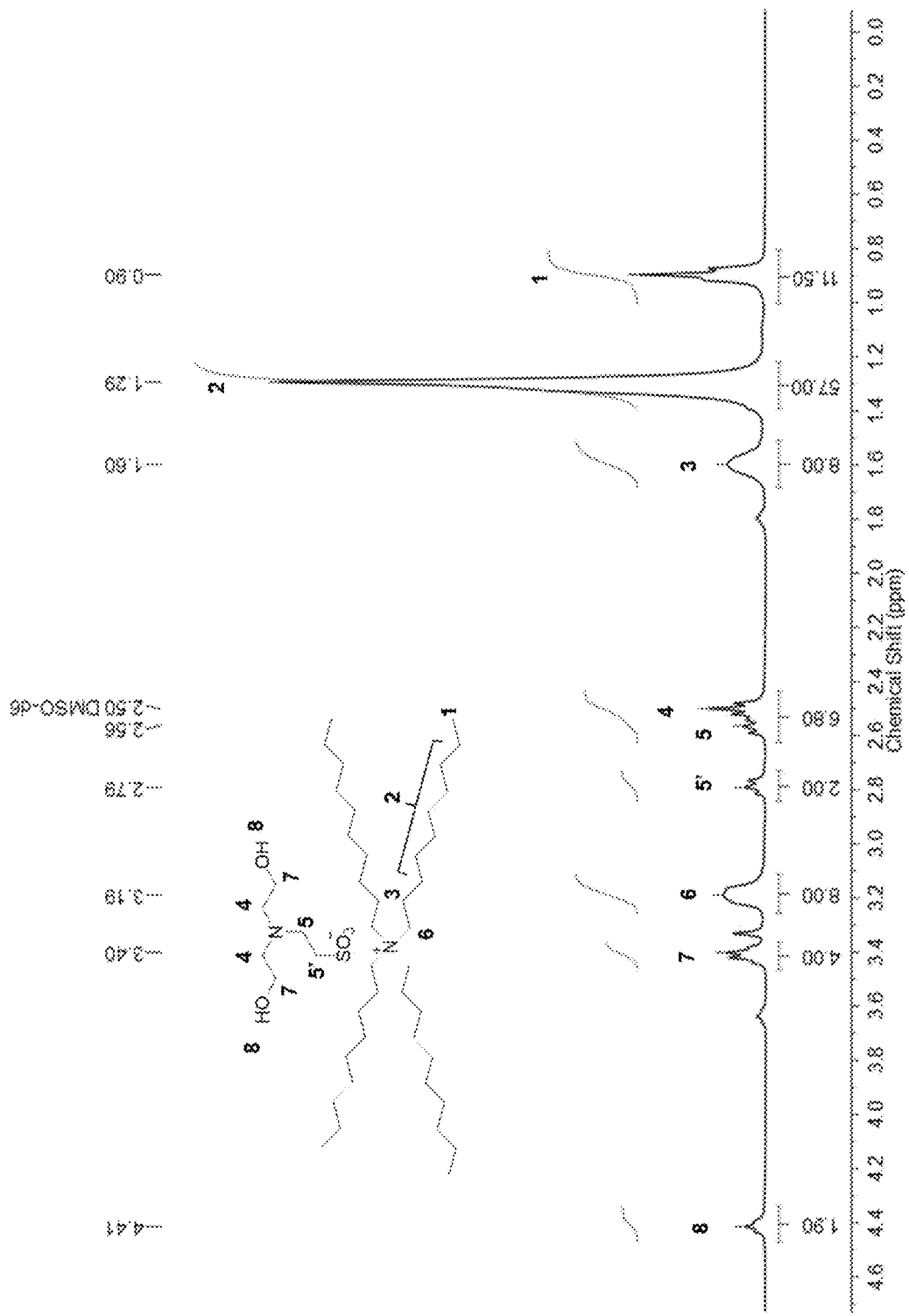
FIG. 3 is a $^1$H-NMR Spectrum for TDA-BES ionic monomer. Integration confirms 1:1 substitution and ionic monomer purity. Peaks 4 and 5 overlap which each other, as well as DMSO-d6.
Figure 4:
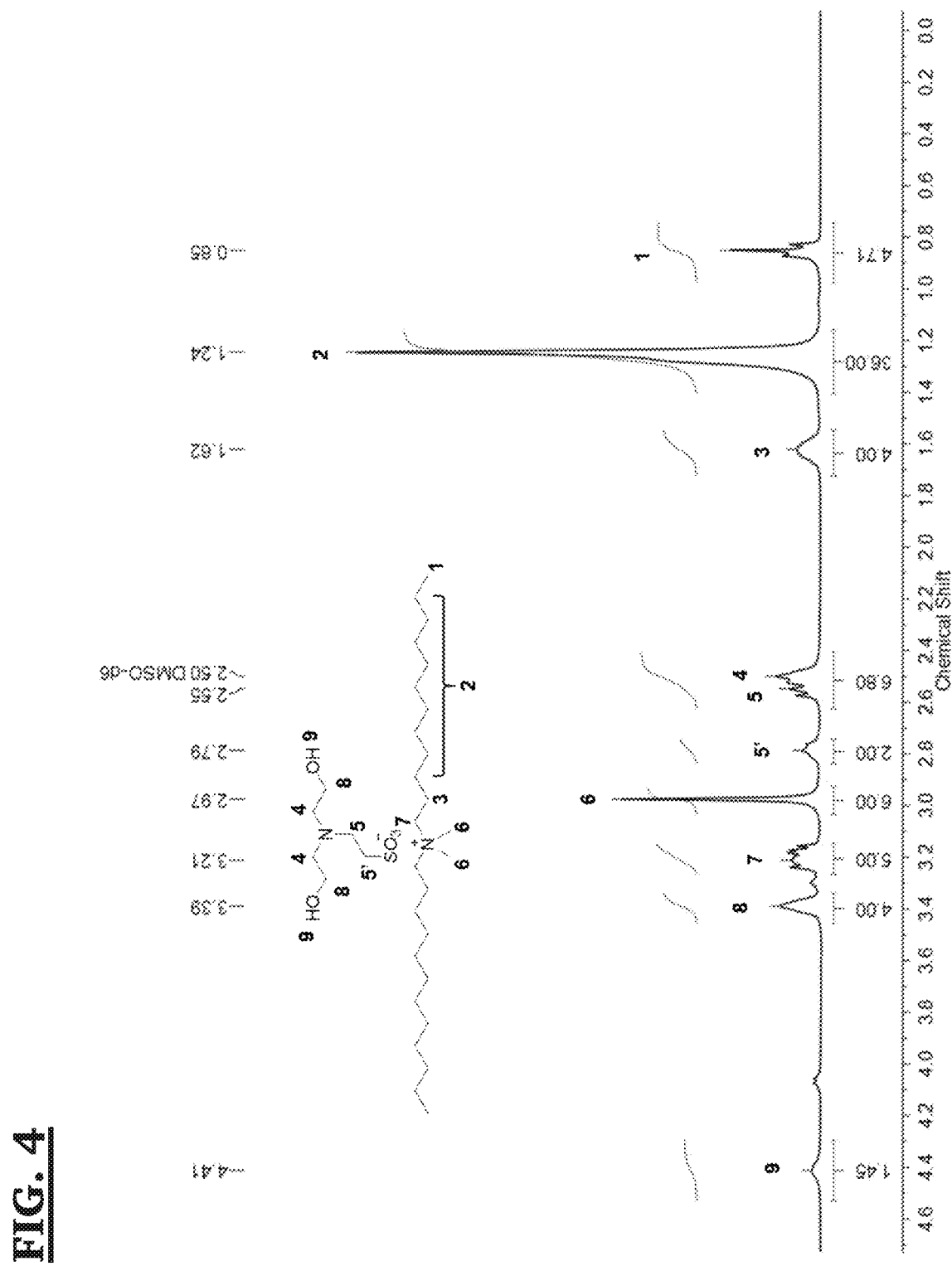
FIG. 4 is a $^1$H-NMR Spectrum for didodecyldimethylammonium (DDA)/BES ionic monomer (DDA-BES). Integration confirms 1:1 substitution and ionic monomer purity.
Figure 5:
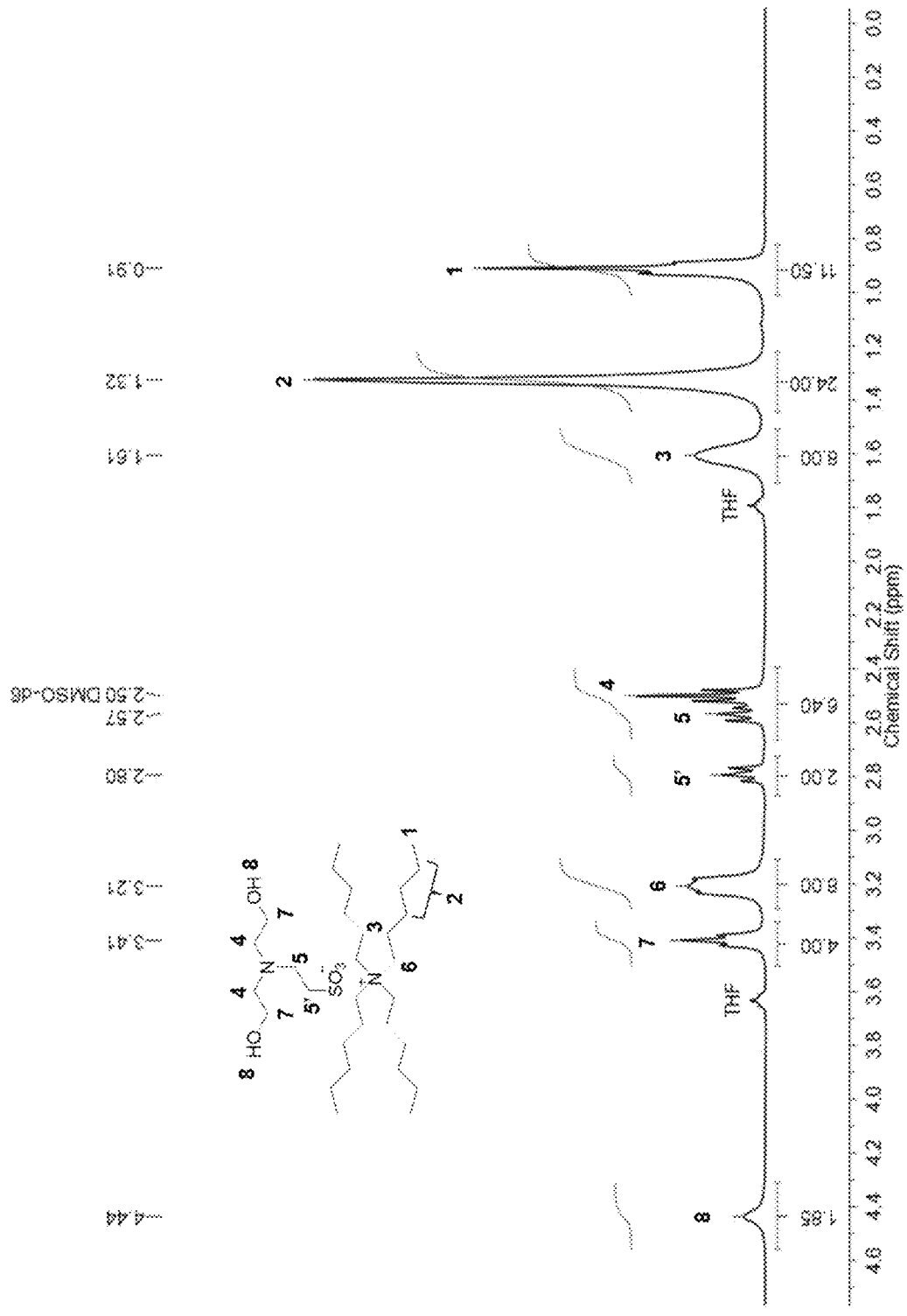
FIG. 5 is a $^1$H-NMR Spectrum for a tetrahexylammonium (THA)/BES ionic monomer (THA-BES). Integration confirms 1:1 substitution and ionic monomer purity.
Figure 6A:
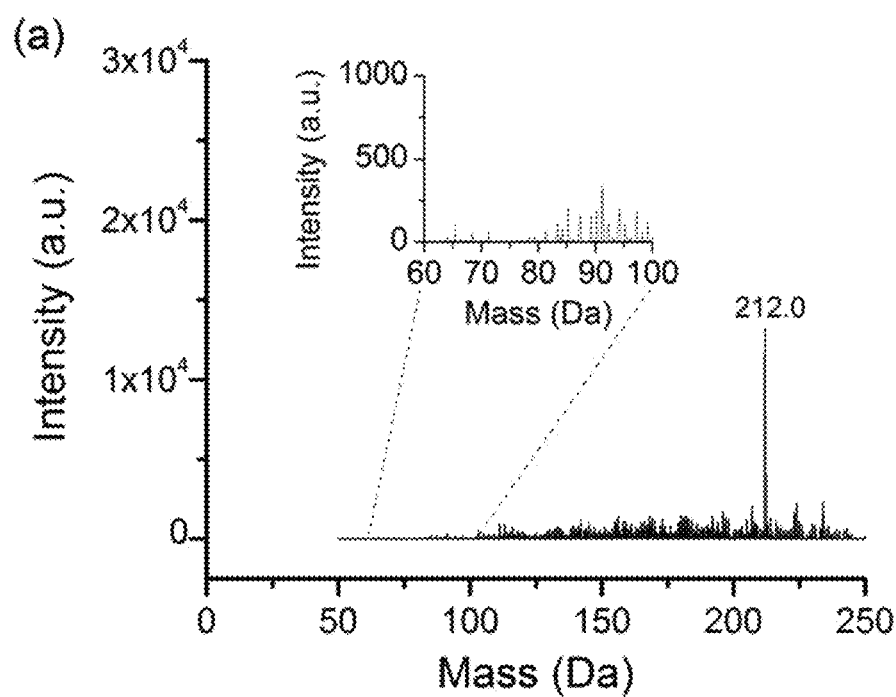
FIG. 6A-B are graphs showing mass spectrometry data confirming the purity of the ionic diol (THA-BES). In negative mode (FIG. 6A), the absence of bromine in the spectrum shows the ion exchange was efficient, and the mass of the BES anion (212.0 Da) was detected and in positive mode (FIG. 6B) the spectra shows the mass of the tetrahexylammonium counterion (354.5 Da).
Figure 6B:
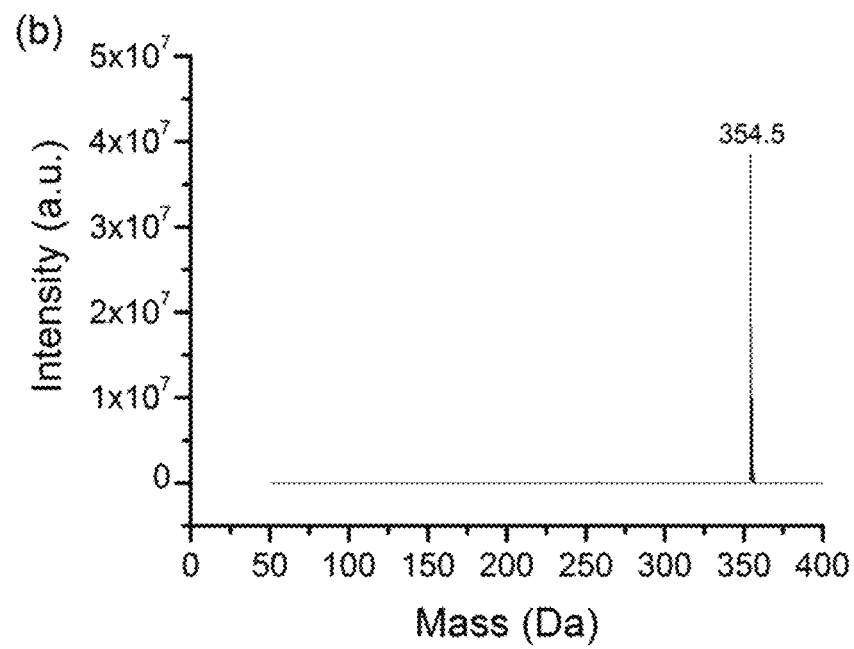

In addition, the TDA-BES spectrum shows the appearance of peaks corresponding to the aliphatic chains of the ammonium counterion (peaks 1-3, and 6), and integration of these peaks reveals a 1:1 molar ratio of BES:TDA, further indicating successful conversion (See FIG. 3). The $^1$H-NMR integrations for DDA-BES and THA-BES are shown in FIGS. 4 and 5, respectively. These also demonstrate 1:1 molar ratios of BES to the corresponding ammonium counterion, indicating successful conversion. Several peaks for the ionic monomers are obscured by the DMSO-d$_6$ residual solvent resonance (δ=2.50). As a result, the BES: ammonium counterion stoichiometry was calculated by integrating the protons alpha to the hydroxyl groups (t, (=3.40) and alpha to the sulfonate anion (t, (=2.80) of BES, and comparing their ratio with peaks (1-3 and 6) from the various ammonium counterions. Mass spectrometry in negative mode was used to confirm the absence of bromine to provide further evidence that substitution occurred (FIGS. 6A-B). All of these ionic monomers were found to be stable viscous liquids at room temperature, which classifies them as ionic liquids, and ranged from clear to slightly yellow in appearance.

2. Characterization of TPUs and TPU Ionomers.

Figure 7:
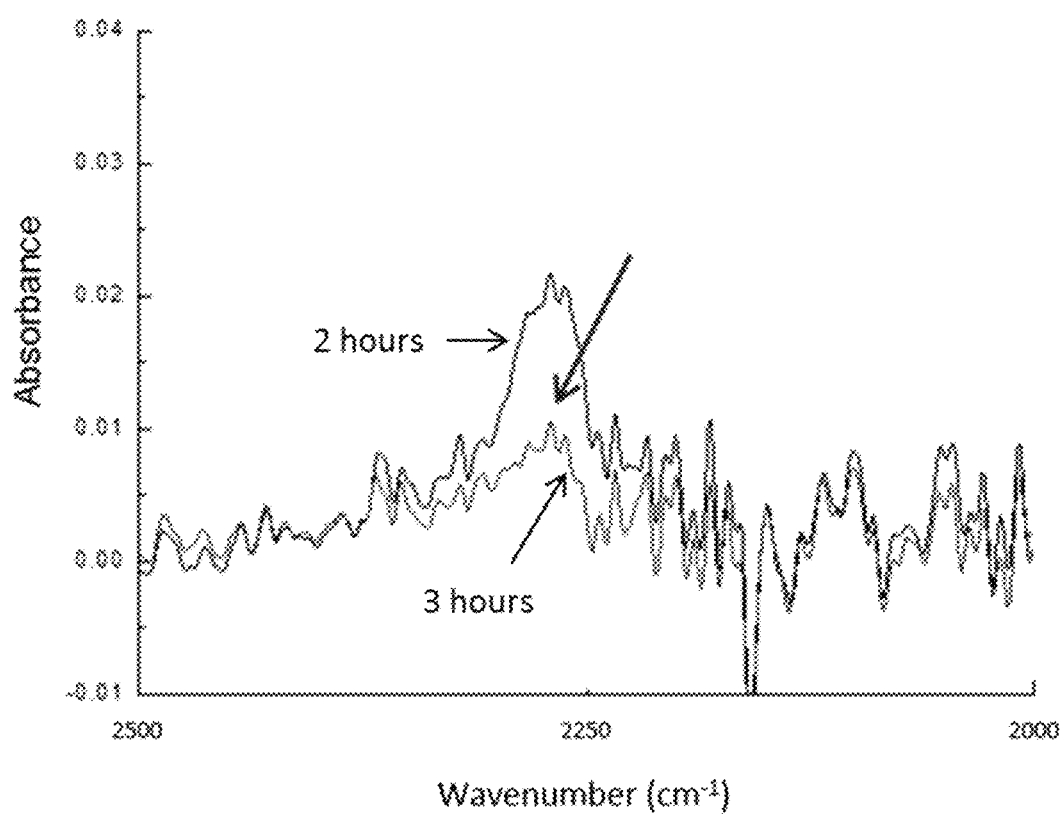
FIG. 7 is a Fourier transform infra-red spectroscopy (FT-IR) spectrum of ionomer product according to one or more embodiments of the present invention obtained after a 2 hour and a 3 hour reaction time. Disappearance of the isocyanate (NCO) absorption at 2270 cm$^{-1}$ would correspond to complete reaction. The expanded spectrum showing the spectral region 2000-2500 cm$^{-1}$ shows that after 3 h the reaction is essentially complete. The arrow identifies the residual signal for the NCO resonance, which is comparable to the noise in the spectrum.
Figure 8:
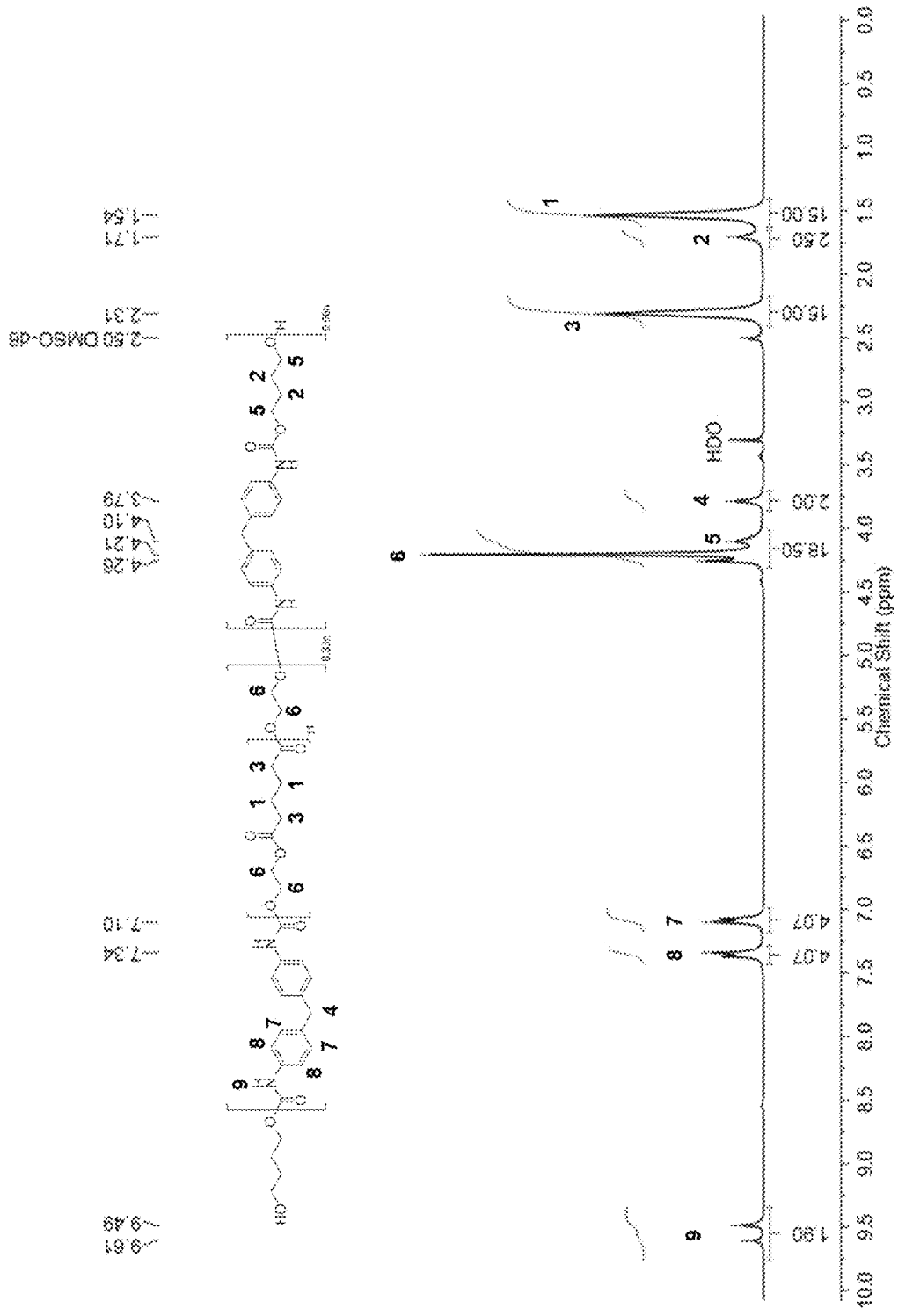
FIG. 8 is a $^1$H-NMR spectrum for 30 wt % hard segment control TPU with PE diol. The peaks labeled 2 and 5 are from 1,4-butanediol (BDO), 4 is the methylene of MDI, 7 and 8 are the aromatic protons from MDI, 9 are the amine protons in urethane linkages, and the remainder belong to the PE diol. The ratio of peak 4:3 provided an accurate calculation of the hard segment content.
Figure 9:
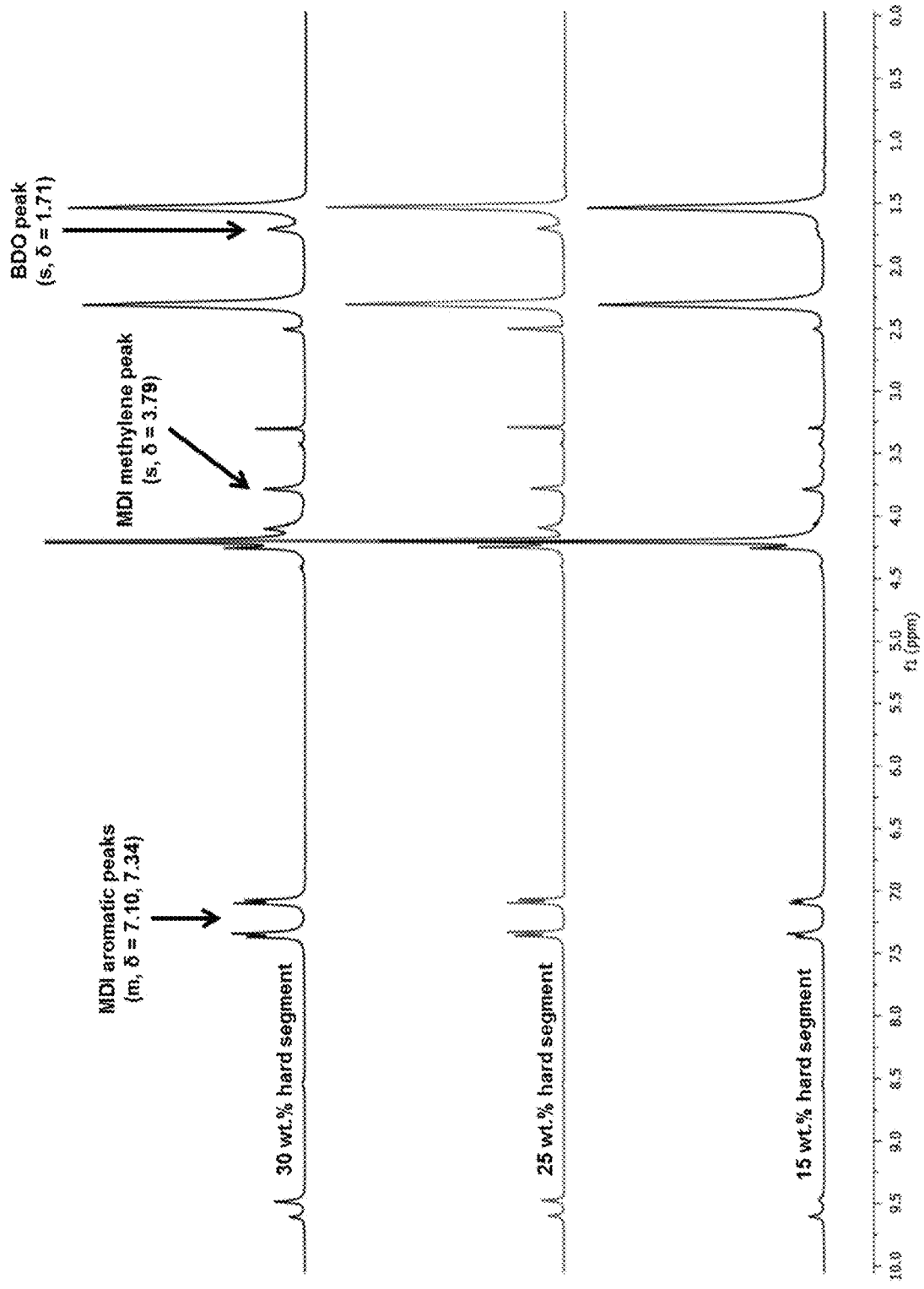
FIG. 9 is a $^1$H-NMR spectra overlay for various wt % control TPUs with PE diol. The intensity was normalized to the leading aliphatic peak (δ=1.54) and a notable decrease in the intensity of hard segment components (BDO, MDI-methylene, and MDI-aromatic) was observed with decreasing MDI and BDO feed ratio. Each spectra was integrated separately to calculate the composition and reported in Table 1, below.
Figure 10:
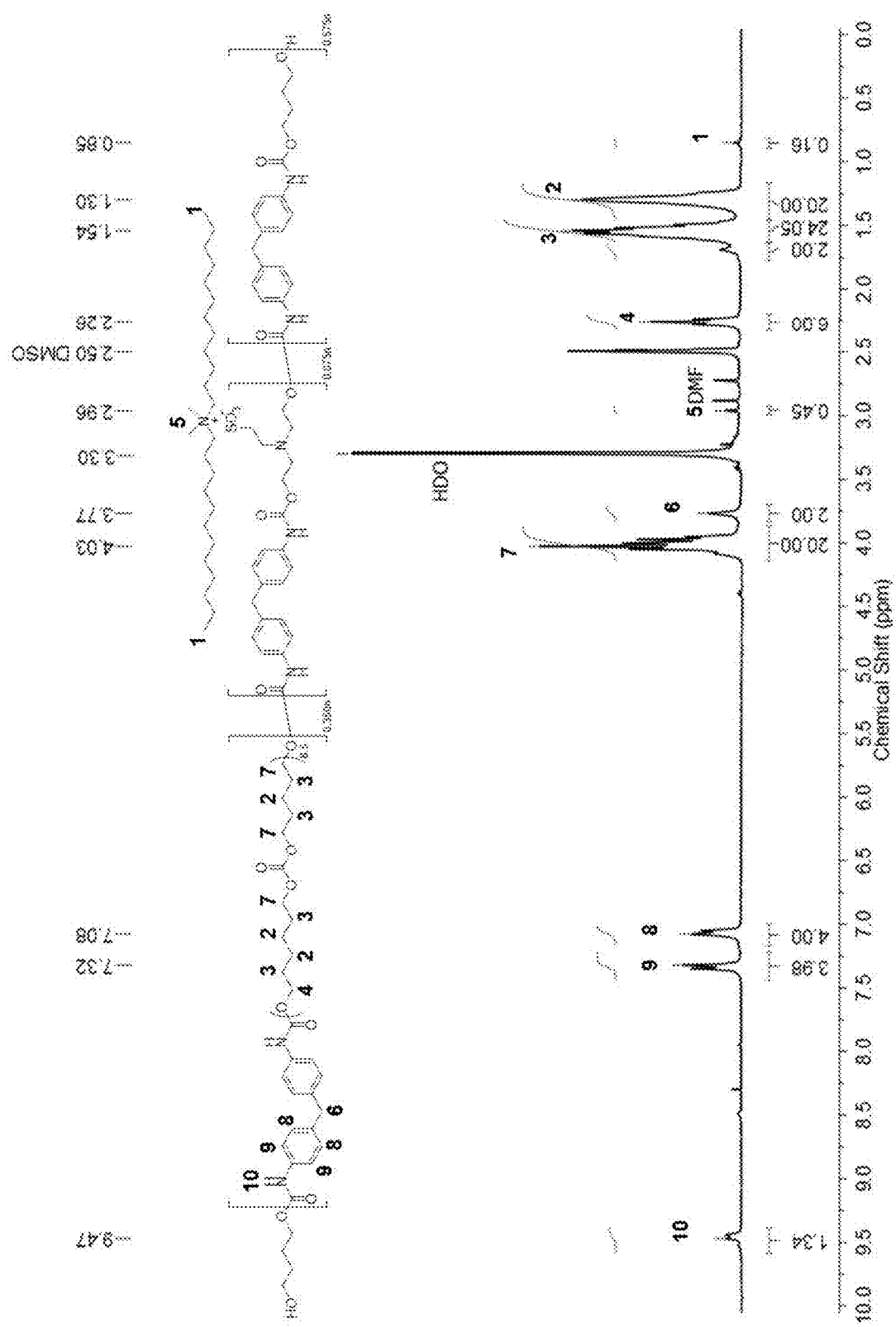
FIG. 10 is a $^1$H-NMR spectrum for TPU30(PC)-3.8DD. The peaks labeled 1 and 5 correspond to the DDA-BES (—CH$_3$) protons on the end of the aliphatic chains and the methyl groups, respectively. Peaks 4, 5, and 6 were used for determining the hard segment and ionic monomer content.
Figure 11:
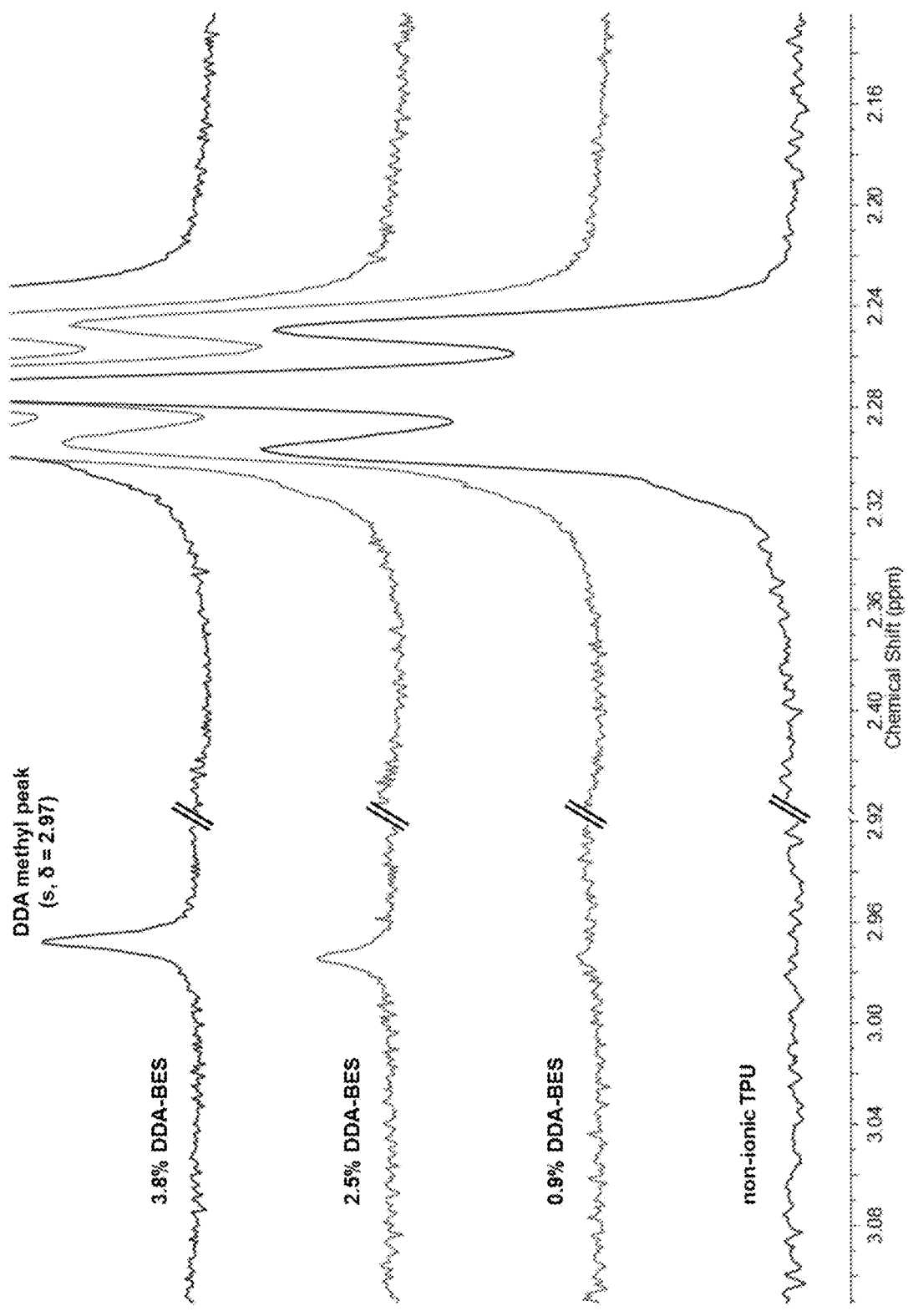
FIG. 11 is a $^1$H-NMR spectra overlay for various compositions of DDA-BES TPU ionomers with PC diol. The intensity was normalized to the PC diol triplet (δ=2.26) and a gradual decrease in the intensity of the DDA methyl peak was observed with decreasing ionic monomer feed ratio. Each spectrum was integrated separately to calculate the composition and reported in Table 1, below.
Figure 12:
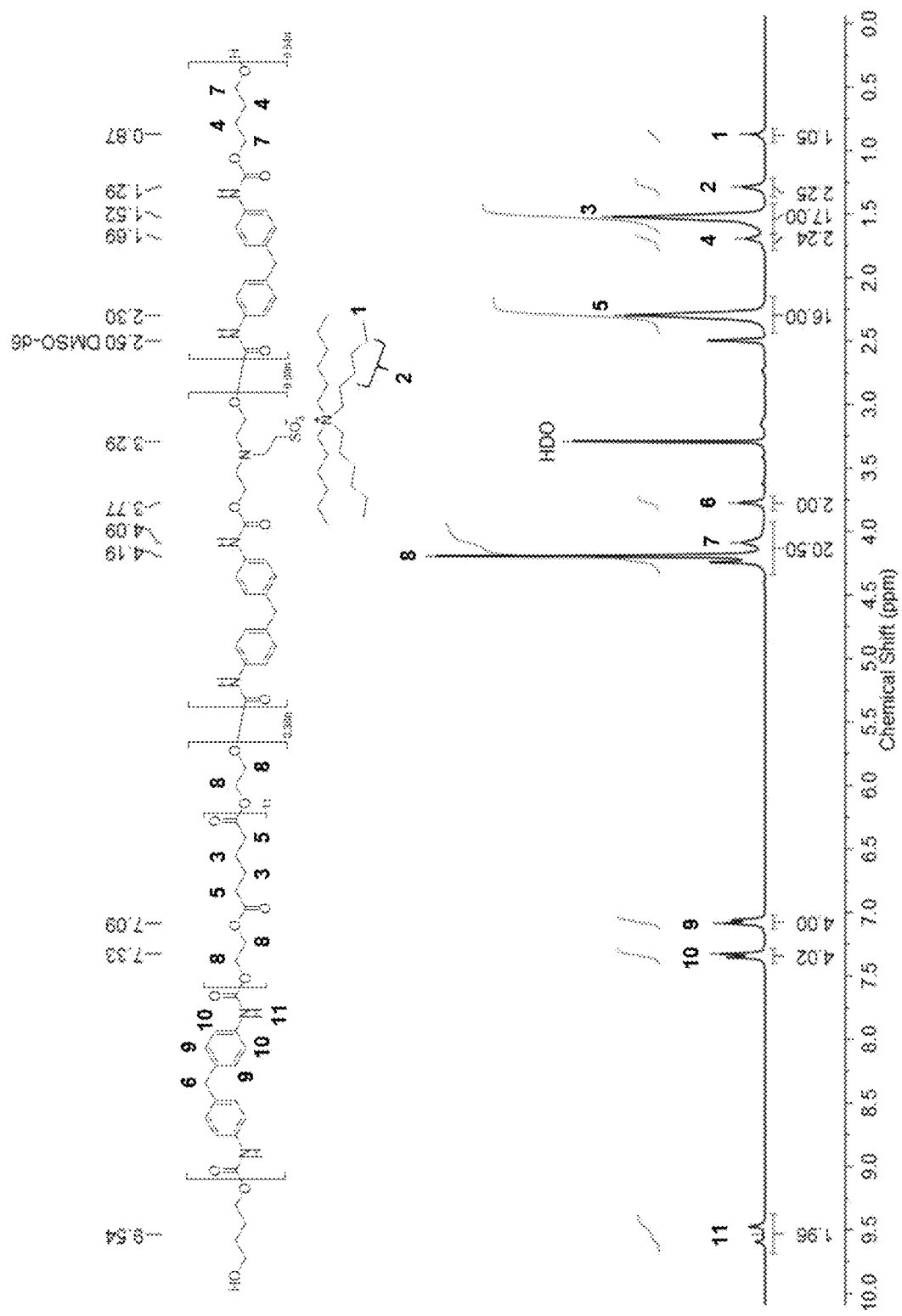
FIG. 12 is a $^1$H-NMR spectrum for TPU30(PE)-4.7TH. The peaks labeled 1 and 2 correspond to the protons on the aliphatic chains (2) and chain ends (1) for THA-BES. Peaks 2, 5, and 6 were used for determining the hard segment and ionic monomer content.
Figure 13:
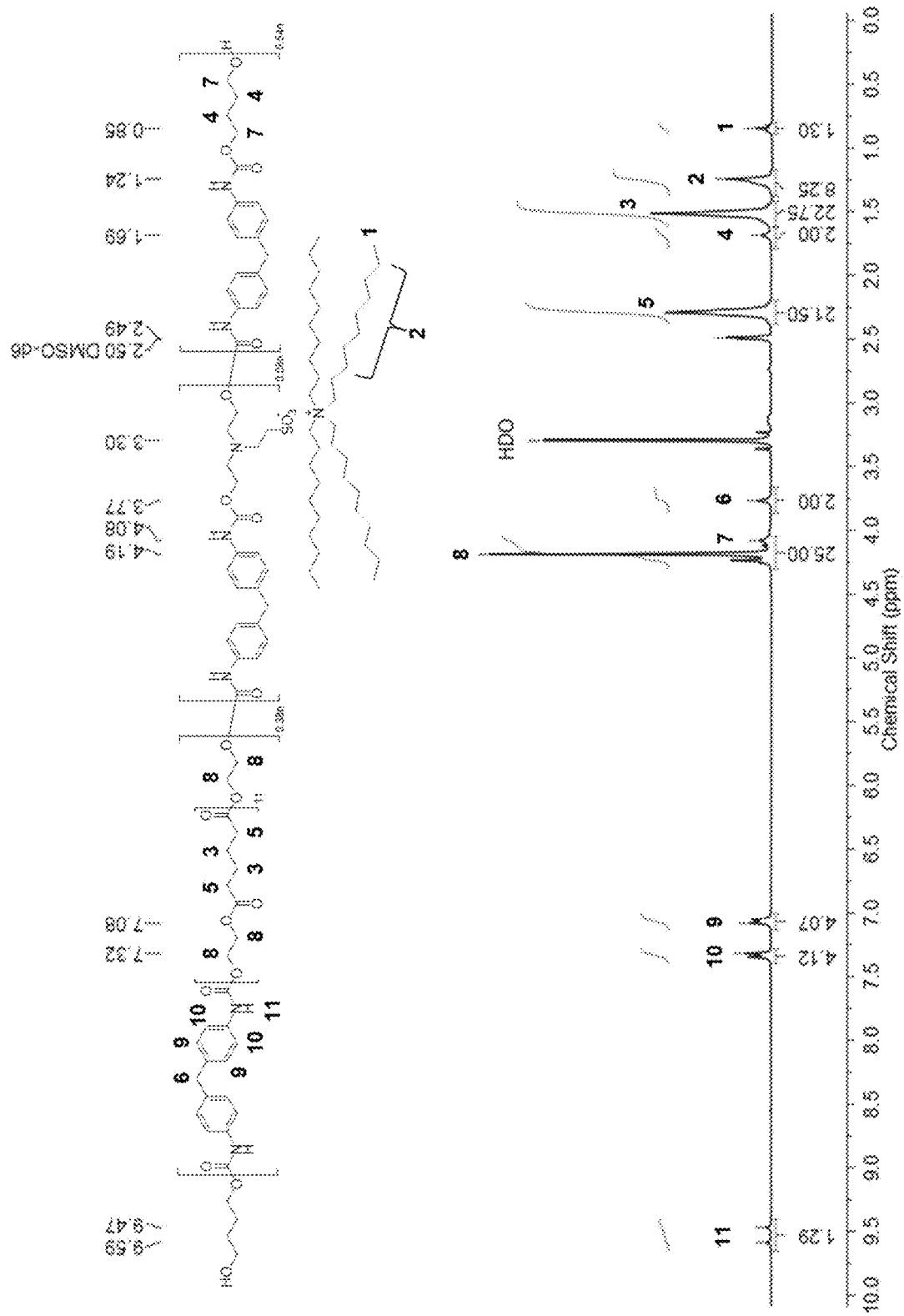
FIG. 13 is a $^1$H-NMR spectrum for TPU30(PE)-7.6TD. The peaks labeled 1 and 2 correspond to the protons on the aliphatic chains (2) and chain ends (1) for TDA-BES. Peaks 2, 5, and 6 were used for determining the hard segment and ionic monomer content.

A variety of TPUs with varying hard segment (15, 25, and 30 wt %) and ionic monomer (1-8 mol %) contents were synthesized, see Table 1. During TPU synthesis, FT-IR was used to measure the disappearance of the NCO peak at 2270 cm$^{-1}$ (See FIG. 7). The expanded region between 2000-2500 cm$^{-1}$ shows that the reaction was complete or nearly complete after 3 h; the intensity of the residual "peak" for the 3 h spectrum is comparable to the noise, which indicates that the concentration of NCO is below the resolution limit of the instrument. In order to determine the hard segment and ionic monomer content of these TPUs, the $^1$H-NMR singlet peak (s, (=3.78) from the methylene group of MDI was used as a reference for the $^1$H-NMR integrations. This series of TPUs with varying hard segment (FIGS. 8-9) and varying ionic monomer contents (FIGS. 10-13) was analyzed by $^1$H-NMR, and their compositions are recorded in Table 1.

TABLE 1

TPUs Synthesized and Evaluated in this Study

| TPU Sample | Soft Segment | Hard Segment Content (wt %)[a,b] | Ionic Monomer Content (mol %)[a] | Molecular Weight (g/mol) ($\overline{M}_n$/$\overline{M}_w$) | Shore A Durometer[e] |
|---|---|---|---|---|---|
| TPU30(PC) | PC | 30.0 | 0 | /21,500 | 71 |
| TPU30(PC)-0.9DD | PC | 32.5 | 0.9 | /49,400 | 70 |
| TPU30(PC)-2.5DD | PC | 32.4 | 2.5 | /26,700 | 70 |
| TPU30(PC)-3.8DD | PC | 32.2 | 3.8 | /21,200 | 58 |
| TPU30(PE) | PE | 29.0 | 0 | 11,400/20,300 | 93 |
| TPU30(PE)-4.7TH | PE | 32.0 | 4.7 | 7,200/18,600 | 71 |
| TPU30(PE)-4.1TD | PE | 32.7 | 4.1 | 7,900/19,500 | 67 |
| TPU25(PE)Sn[c] | PE | 24.7 | 0 | 18,900/45,400 | 65 |
| TPU25(PE)-4.3TD[c] | PE | 27.2 | 4.3 | 13,300/33,500 | 58 |
| TPU30(PE)Sn[c] | PE | 29.4 | 0 | 12,900/37,000 | 86 |
| TPU15(PE)Sn[c] | PE | 15.2 | 0 | 14,000/28,100 | 27 |
| TPU25(PE)Sn[c,d] | PE | 24.8 | 0 | 55,500/93,500 | 72 |
| TPU25(PE)-4.4TD[c,d] | PE | 24.6 | 4.4 | — | 58 |
| TPU30(PE)-7.6TD[c,d] | PE | 29.0 | 7.6 | — | 37 |

[a] The hard segment and ionic monomer content were calculated by $^1$H-NMR.
[b] The hard segment content includes the MDI, BDO and BES-ammonium monomer.
[c] Stannous octoate catalyst was used to increase molecular weight.
[d] Reactions were performed using bulk conditions, 100° C. with mechanical stirring.
[e] Durometer measurements were performed 24 hours after compression molding As shown in Table 1 and discussed herein, the TPU ionomers tested are described using the following nomenclature: TPU+wt % hard segment+the long chain diol used for the soft segment (PE or PC)+the mol % ionic monomer in the sample+a two letter abbreviation for the quaternary ammonium cation used (i.e. DD=DDA cation, TD=TDA, TH=THA) or Sn to indicate use of a stannous octoate catalyst to increase molecular weight. By way of example, the term TPU30(PE)-7.6TD would refer to a TPU ionomer having 30 weight % hard segment, made using a polyester diol soft segment, and having 7.6 mole % of the BES-TDA ionic monomer.

Figure 14:
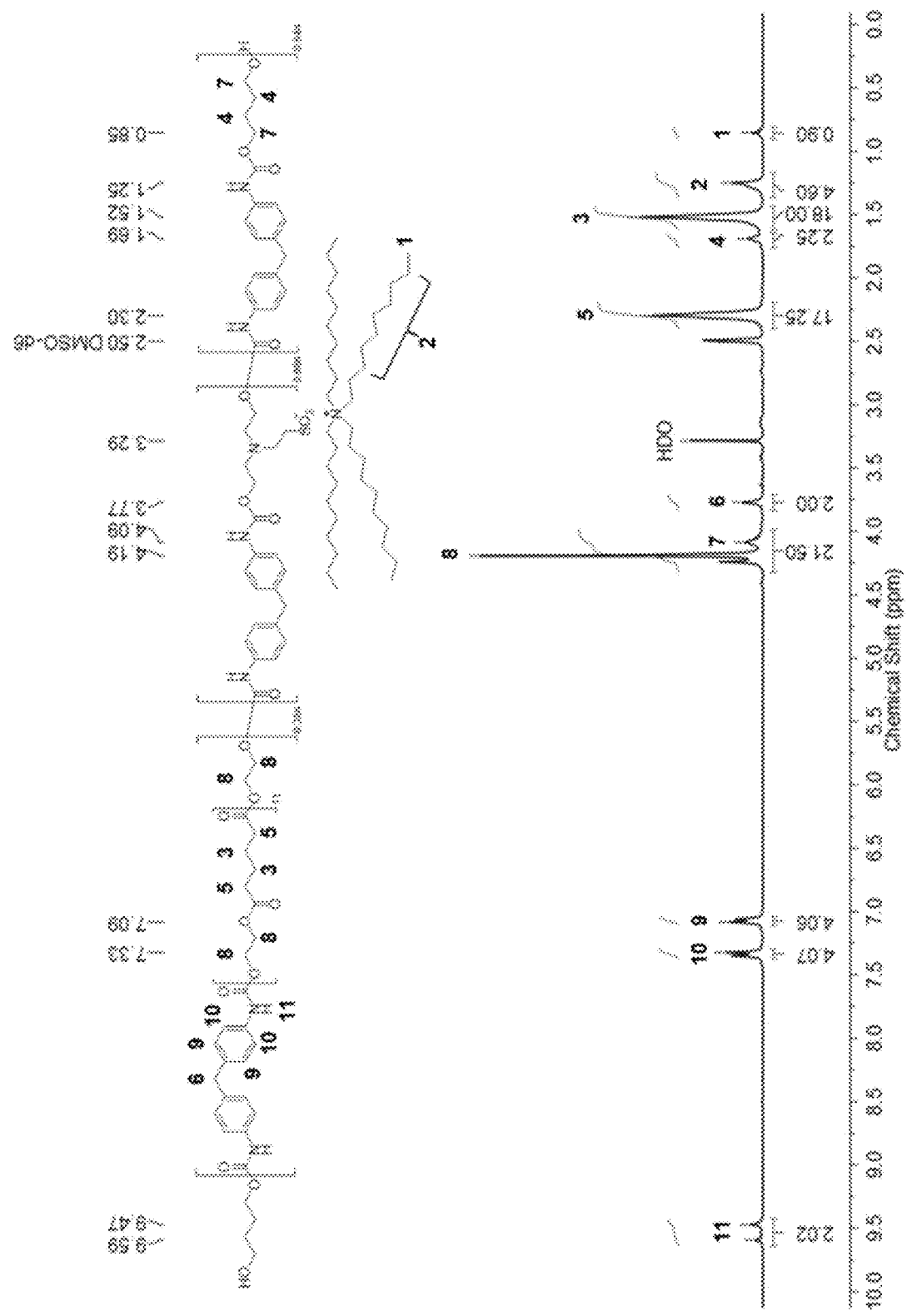
FIG. 14 is a $^1$H-NMR spectrum for a TPU according to one or more embodiments of the present invention (TPU30(PE)-4.1TD). The peaks labeled 1 and 2 correspond to the protons on the aliphatic chains (2) and chain ends (1) for TDA-BES. Peaks 2, 5, and 6 were used for determining the hard segment and ionic monomer content.

A sample spectrum of 4.1 wt % TDA-BES TPU with PE diol "TPU30(PE)-4.1TD" is provided in FIG. 14. An example calculation of the TPU composition is as follows. The peak for the methylene resonance in MDI, peak 5 in FIG. 14, was integrated and the ratio of the integration and the actual number of protons (2 for methylene) was set to a value of 1. The relative concentration of the PE diol was then calculated from the ratio of the integration of peak 3 (17.25) and the actual number of protons in the diol (44). Thus, for the spectrum in FIG. 14, the ratio of diol to MDI was (17.25/44)=0.39. Similarly, the relative concentration of the ionic species was calculated from the ratio of the integration of peak 2 (4.60) and the actual number of protons in TDA-BES (6), i.e., (4.60/56)=0.082. The BDO resonances in FIG. 14 are clearly resolved, because of overlap with other peaks, so the relative BDO concentration was assumed to be the difference between the MDI and the concentrations (normalized to MDI) of the PE diol and the ionic monomer. For the TPU30(PE)-4.1TD spectrum, that calculation [BDO]=[MDI]−[DDA]−[DD-BES] is: 1−0.39−0.082=0.528.

The initial TPU series using DDA-BES was used to estimate the ionic monomer concentration required to lower the durometer (measured as Shore A hardness) of a TPU containing 30 wt % hard segment with a PC diol soft segment. In addition to a control, TPU30(PC), ionomers containing 0.9, 2.5, and 3.8% DDA-BES were synthesized (TPU30(PC)-xDD where x=the mol % ionic monomer in product and DD denotes the DDA cation). The durometer values listed above in Table 1 for this series indicate that an ionic monomer concentration of just 3.8 mol % produced significant softening (13 durometer points). A change from DDA to tetra-substituted ammonium salts (THA, TDA) with more steric hindrance was found to improve the softening effect. The PC diol was also switched to a PE diol to eliminate any crystallinity contributed by the soft segment. The data in Table 1 may be used to compare the effect of increasing the chain length of the ammonium salt from hexyl to decyl, and the effect of decreasing the hard segment content for a non-ionic TPU. Increasing the alkyl chain length of the quaternary ammonium counterion from hexyl (n=6) to decyl (n=10) produced softer TPU ionomers, as can be seen from the Shore A durometer which decreased from 93 for the non-ionic TPU30(PE) to 71 for TPU30(PE)-4.7TH and 67 for TPU30(PE)-4.1TD, even though the latter TPU had a lower ionic monomer concentration (4.1 vs. 4.7 mol %, see Table 1). Decreasing the hard segment concentration also lowered the durometer, as would be expected by the lower MDI crystallinity in the TPU.

3. TPU Durometer and Softening.

Shore A durometer measurements were performed following ASTM Standard D-2240 (Standard Test Method for Rubber Property-Durometer Hardness), and the values for the TPUs are listed in the last column of Table 1. The one exception to the D-2240 procedure was that the specimens were aged in the laboratory at about 23° C. for only 24 h, as opposed to the 40 h prescribed by the ASTM Standard. The error involved with the shorter aging time is considered small, based on the time-dependent durometer data shown in FIG. 15 for TPU25(PE), TPU25(PE)-4.4TD and TPU30 (PE)-7.6TD, which shows that after aging the samples for 24 h (1440 min), the durometer appears to have reached equilibrium. It is believed that the time dependence is most likely due to the slow crystallization of the hard segments.

Figure 16:
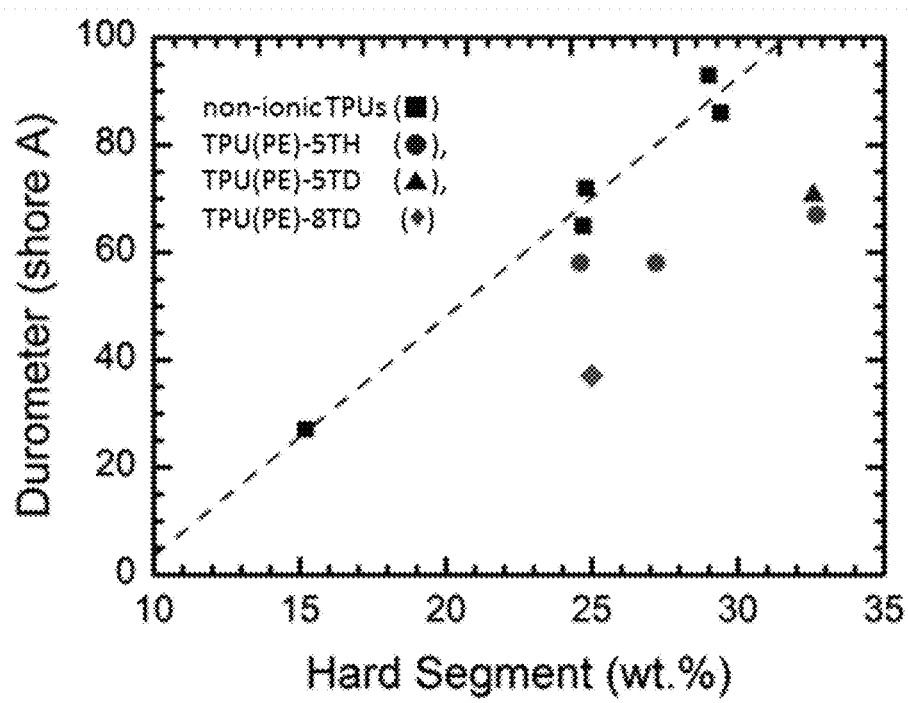
FIG. 16 is a graph showing the effect of hard segment content (wt %), ionic monomer concentration (mol %), and ammonium countercation on the durometer of non-ionic TPUs (■), nominal TPU(PE)-5TH (●), nominal TPU(PE)-5TD (▲), nominal TPU(PE)-8TD (♦). Shore A durometer values were measured after 24 h. The dashed line is the linear least squares fit of the data for the non-ionic TPUs. The ionic concentration of the nominally 5 mol % samples varied from 4.1 to 4.9 mol % and the nominally 8 mol % sample was 7.6 mol %.

In general, decreasing the hard segment concentration and increasing the ionic monomer concentration produced softer TPUs (See, FIG. 16). Also shown in FIG. 16, the size of the two counterions used (THA vs. TDA) had only a minor effect on the durometer (several point decrease); however, changing the substitution on the ammonium from two aliphatic chains to four decreased the durometer an additional ~10 points. Overall, the objective of this investigation to soften the TPU by the incorporation of sulfonate groups was achieved, though in addition to the sulfonate concentration, the amount of softening depended on the hard segment content of the TPU, and the number of alkyl chains on the ammonium counterion and the size of the counterion. The lowest durometer reported herein was a Shore A of 37 with TPU25(PE)-7.6TD, i.e., a TPU containing 25 wt % hard segment with the PE diol and 7.6 mol % of TDA-BES ionic monomer, which was a 35 point decrease in hardness (from a Shore A hardness of 72 to 37) when compared to the control non-ionic TPU.

4. Thermal, Mechanical and Viscoelastic Properties of the TPUs.

Figure 17A:
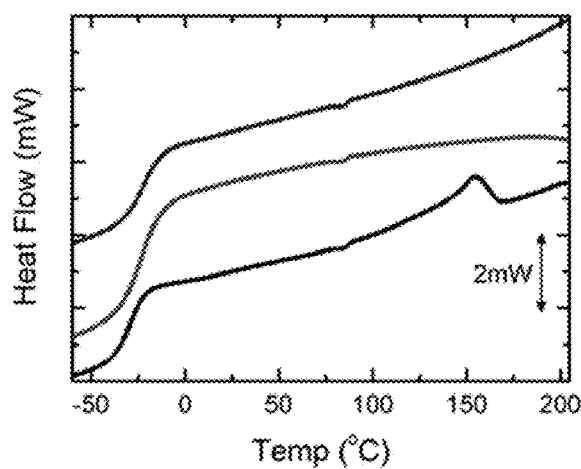
FIG. 17A-B are example differential scanning calorimetry (DSC) thermograms for TPU30(PE) (bottom line), TPU30 (2)-4.7TH (middle line) and TPU30-4.1TD (top line) showing: cooling following the first heating scan (FIG. 17A); and second heating scan (FIG. 17B). Exothermic behavior is up in these scans, and the curves have been vertically displaced for clarity. The crystallization peak for TPU30(PE) in the cooling scan near 155° C. is suppressed in the ionic TPUs, and the corresponding melting peak at 185° C. in the heating scan is broadened and shifted to lower temperature for the ionomers. In addition, the ionic TPUs exhibited significant cold-crystallization between 50 and 100° C. (i.e., the broad exotherm in the heating scan), which was followed by a broad melting endotherm between 100 and 150° C.
Figure 17B:
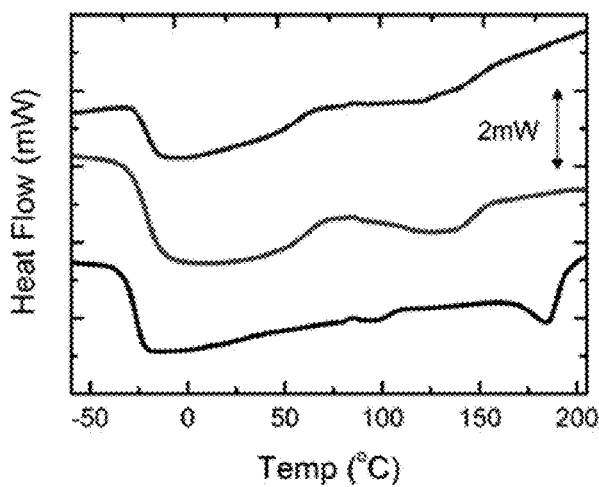

Several techniques were employed to characterize the thermal, mechanical, and viscoelastic properties of the TPUs prepared with the PE diol. Typical DSC thermograms of the TPUs are shown in FIGS. 17A-B, which display the heating and cooling behavior of TPU30(PE), TPU30(PE)-4.7TH and TPU30(PE)-4.1TD. In general, the introduction of the ionic monomer had little effect on the glass transition, but it suppressed crystallization, as evidenced by the absence of the exotherm seen in the cooling curve for the non-ionic TPU at −155° C. for the ionic TPUs. The heating scan for the non-ionic TPU shows a melting point at 185° C. and a weak endotherm near 100° C., the origin of which is not known with certainty; it may be melting of some small hard block crystals. The very small endothermic peak in all of the cooling scans near 80° C. is not likely due to the TPU, and is probably an artifact due to loss in control of the temperature of the DSC during cooling. It is not the hard segment glass transition, which occurs at a lower temperature based on the dynamic mechanical data described later in this report. The ionic TPUs exhibited significant cold-crystallization between 50 and 100° C. (i.e., the broad exotherm in the heating scan), which was followed by a broad melting endotherm between 100 and 150° C.

The large suppression of the melting point compared to the non-ionic TPU (185° C.) is most likely due to the formation of very small crystallites. The change in the crystallization behavior and lowering of the melting point is consistent with the introduction of a non-crystallizable component into the TPU. The presumed small crystallites may also be a consequence of the ionic species nucleating crystallization, as has been observed with other semi-crystalline ionomers. However, at this time those comments are strictly speculation, since the microstructure and crystallization behavior were not studied in detail. The lower crystallinity of the ionic TPUs is, at least, partly responsible for the softening effect of incorporating the ionic species into the polymer. The size of the cation may also have an effect, though it appears that the softening imparted by the ionic monomer is primarily a result of disrupting the hard segment crystallinity (as the $T_g$ remains unaffected). Hence, the data in FIGS. 17A-B and Table 1 suggest that the dominant influence for the softening is the reduction in the crystallization rate and the amount of crystallinity achieved.

Figure 18:
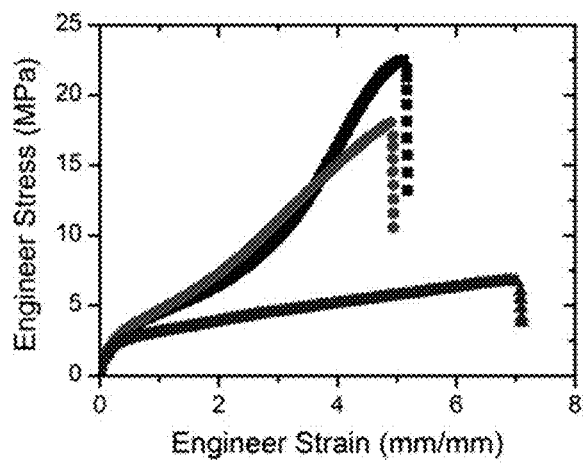
FIG. 18 is a graph showing representative stress vs. strain data for TPU25(PE) (■), TPU25(PE)-4.4TD (●) and TPU25(PE)-7.6TD (▲). The testing conditions are described in the Experimental Section, below.

Typical tensile stress strain data for TPU25(PE), TPU25(PE)-4.4TD and TPU25(PE)-7.6TD are shown in FIG. 18, and the tensile properties are summarized in Table 2. Because the linear region of the stress-strain curve was difficult to resolve for these elastomers, the modulus was reported as a secant modulus at 50% strain. The introduction of the ionic species decreased the modulus, presumably due to its suppression of crystallization as previously described.

TABLE 2

Tensile Properties of a Non-ionic and Ionic TPUs with same Hard Segment Content

| Sample | $E_{50}$ (MPa) [a] | $\sigma_u$ (MPa) [b] | $\varepsilon_u$ (%) [c] |
|---|---|---|---|
| TPU25(PE) | 6.59 ± 1.20 | 21.2 ± 0.67 | 560 ± 130 |
| TPU25(PE)-4.4TD | 5.92 ± 0.51 | 18.8 ± 1.41 | 397 ± 94 |
| TPU25(PE)-7.6TD | 4.57 ± 0.97 | 6.85 ± 1.45 | 650 ± 125 |

Figure 19:
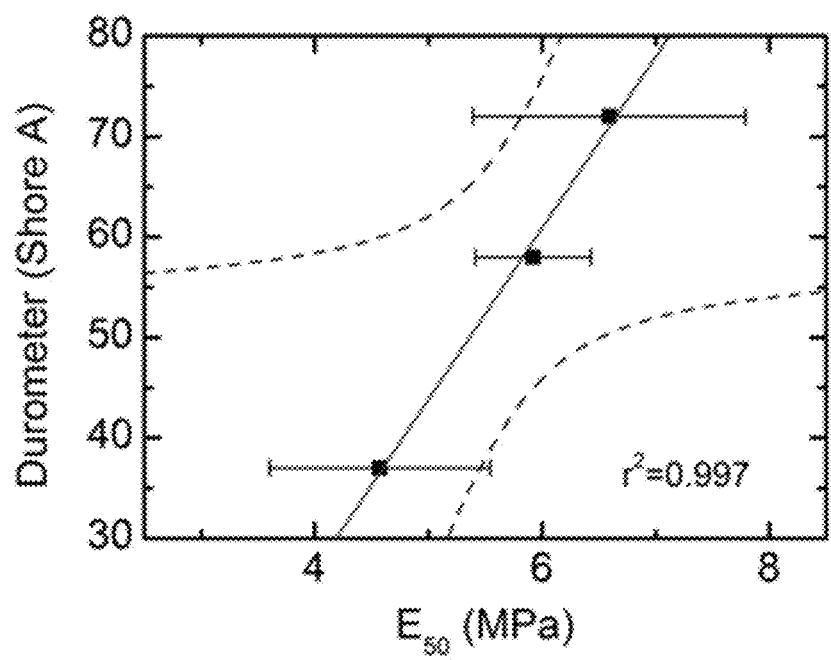
FIG. 19 is a graph showing Shore A durometer vs. secant modulus at 50% strain ($E_{50}$) for TPU25(PE), TPU25(PE)-4.4TD and TPU25(PE)-7.6TD. The solid line is the linearly least squares fit to the data ($r^2$=0.997) and the dashed lines represent the 95% confidence limit for the linear correlation.
Figure 20:
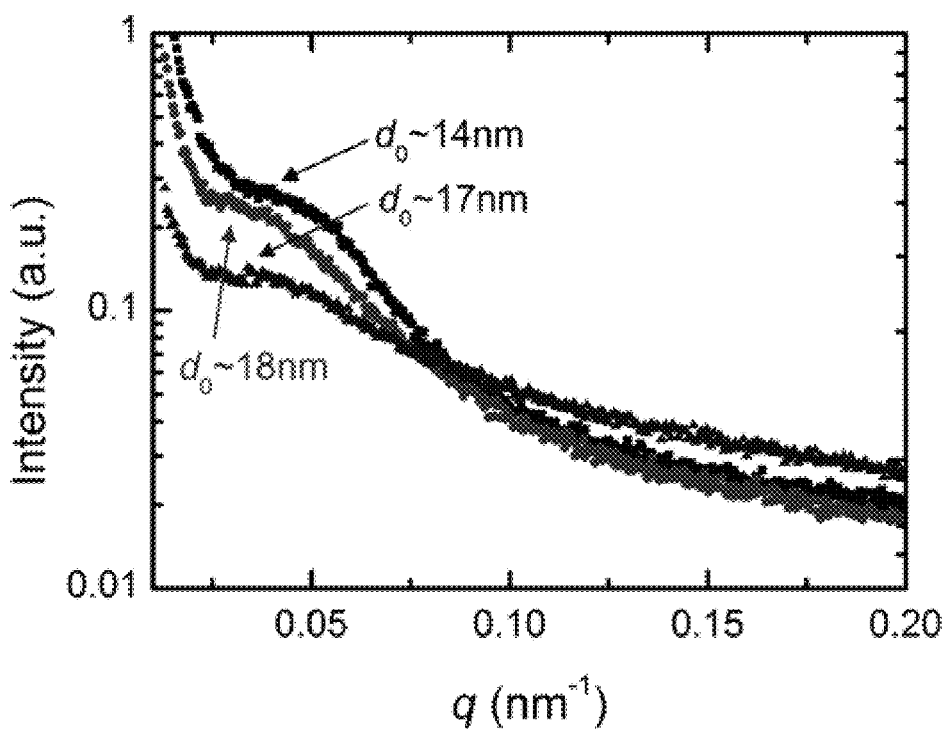
FIG. 20 is a graph showing small angle X-ray scattering (SAXS) data for TPU30(PE) control (■), TPU30(PE)-4.1TD (●) and TPU30(PE)-4.7TH (▲).

[a] $E_{50}$ = secant modulus at 50% strain
[b] $\sigma_u$ = breaking stress
[c] $\varepsilon_u$ = breaking strain In addition, the durometer for these three TPUs tracked linearly with the 50% strain secant modulus ($E_{50}$), as shown in FIG. 19. The linear fit had a coefficient of determination ($r^2$) that was nearly unity, which indicates the fit is excellent. However, the large 95% confidence intervals shown by the dashed lines indicate that more data are needed to validate the linear correlation. The ionomers also had lower stress at break than the non-ionic TPU, (See, Table 2), which is consistent with the lower hard segment crystallinity. The shape of the stress-strain curves for TPU25(PE) and TPU25(PE)-4.4TD were similar and the stress levels achieved were also similar, though the strain at break of was much lower for the ionomer. The lower strain at break may be due to a rougher surface of the ionomer specimen, which produced premature fracture. That explanation is consistent with the large standard deviation for all of the samples and the much higher elongation at break for the TPU25(PE)-7.6TD sample, which is what would be expected as the hard segment crystallinity decreased. However, one cannot dismiss the possibility that the trend of decreasing strain to break for low sulfonate concentration and higher strain to break at higher concentration, because of the complex microstructure of these TPUs. Because of the large cations used, which typically suppress the ionic aggregation observed in metal-neutralized ionomers, it is doubtful that the lower strain to break is due to the formation of nanoscale ionic clusters. Small angle X-ray scattering (SAXS) tests were done for TPU30(2), TPU30(2)-4.7TH and TPU30(2)-4.1TD and the results are shown in FIG. 20). In the SAXS tests reflected in FIG. 20, the scattering vector was defined as:

$$q = \frac{4\pi \sin\left(\frac{\theta}{2}\right)}{\lambda} \quad \text{(Eq. 1)}$$

where $\lambda$ is the wavelength of the scattering radiation ($\lambda_{CuK\alpha}=0.154$ nm) and $\theta$ is the scattering angle. The $d_o$ was calculated from the Bragg spacing associated with the peak in scattering intensity, i.e.:

$$do = \frac{2\pi}{q_{max}} \quad \text{(Eq. 2)}$$

where $q_{max}$ is the scattering vector value at the maximum intensity of the peak. These values indicate that the domain spacing, $d_o$, for the TPU microstructure increased from $d_o$=14 nm for the non-ionic TPU to closer to 20 nm when the ionic groups were introduced into the TPU.

Figure 21A:
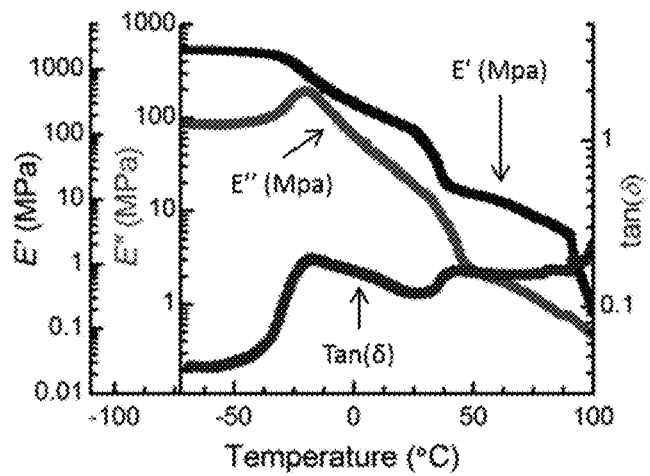
FIGS. 21A-C are graphs showing dynamic mechanical analysis (DMA) data for TPU30(PE) (FIG. 21A), TPU30
Figure 21B:
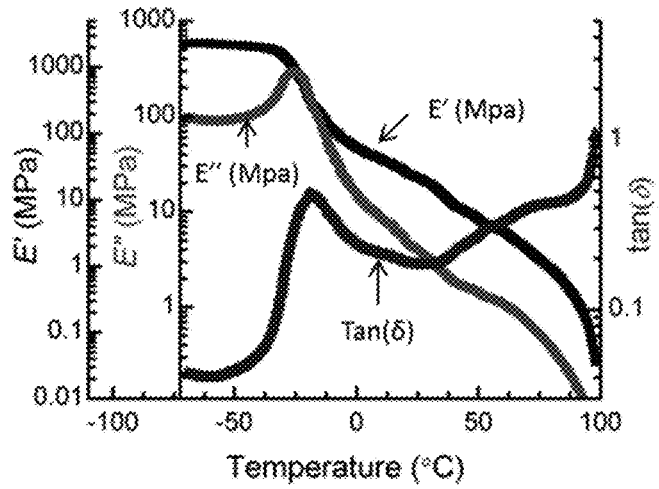
Figure 21C:
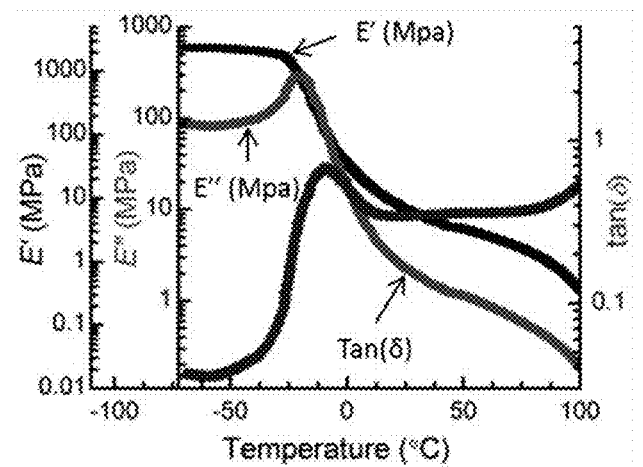

The effect of the alkyl chain length for the TPU ionomers neutralized with quaternary ammonium cations is shown by the dynamic mechanical properties of TPU30(PE), TPU30(PE)-4.7TH and TPU30(PE)-4.1TD in FIGS. 21A-C. The non-ionic TPU (TPU30(PE)) showed a glass transition for the soft phase characterized by peaks in the loss modulus (E") at −25° C. and tan δ at −22° C., FIG. 21A.

A second mechanical transition occurred above room temperature, as indicated by the large drop in E' and the peak in tan δ at 36° C. The origin of this transition is not clear. It may be a glass transition associated with the hard segment nanodomains or it could be due to melting of smaller, imperfect crystals in the hard nanodomains. The glassy dynamic modulus (E' of TPU30(PE) was about 2 GPa and E' dropped to ~200 MPa at the soft phase glass transition, and to ~10 MPa during the hard segment glass transition (~20-40° C.). At 100° C., E' was ~2 MPa. The persistence of the rubber-like modulus at high temperature is consistent with the crystalline hard segments that act as physical crosslinks in the TPU.

For TPU30(PE)-4.7TH, with a C6 chain-length for the alkyl groups of the quaternary ammonium cation, the DMA curves (FIG. 21B) show that the temperatures of the peaks in E" and tan δ for the soft phase glass transition, −25° C. and −20° C., respectively, were similar to those for the non-ionic polymer. However, the decrease of E' from ~2 GPa to ~30 MPa was much larger than that of the non-ionic polymer. This result is a consequence of the lower crystallinity in the ionomer, as evidenced by the DSC data in FIGS. 17A-B that shows the crystallization rate was much slower in the ionomer. The drop in E' at the transition above room temperature occurred over a broader temperature interval, −25-50° C., than for the non-ionic TPU, but peaks in E" and tan δ were not clearly resolved for the ionomer. E' decreased much more rapidly above the hard segment glass transition compared to the non-ionic TPU, as E' at 100° C. was less than 0.1 MPa for the ionomer.

The DMA curves for TPU30(PE)-4.1TD (FIG. 21C), with a C10 chain-length for the alkyl groups of the quaternary ammonium cation, reveal only a single, very broad glass transition. Low temperature peaks for E" and tan(δ) were observed at −21° C. and −11° C., which were lower than for the non-ionic TPU and TPU30(PE)-4.4TH, despite having a lower ionic monomer content. E' decreased from ~2 GPa to 2 MPa over a temperature range from ~5° to 40° C. The much larger decrease of E' for this ionomer indicates that either the crystallization rate of the hard segments was even slower for the TDA-neutralized ionomer than for the THA-neutralized ionomer, or that the bulkier cation was more effective at suppressing the crystallinity. In fact, the shape of the E' curve in FIG. 21C and the lack of any peak in E" and tan(δ) above 20° C. suggest that TPU30(PE)-4.1TD was not phase separated, i.e., that there was only a single, mixed phase. The SAXS data (see, FIG. 20) clearly indicate microphase separation, but the SAXS data were obtained at ~23° C. so they do not rule out the possibility of phase mixing above an upper critical solution temperature. As seen with the TPU30(PE)-4.7TH ionomer, E' of TPU30(PE)-4.1TD decreased relatively rapidly above room temperature, again consistent with little or no hard segment crystallinity, and E' at 100° C. was only ~0.2 MPa.

The complex viscosity functions, $\eta^*(\omega)$, for TPU30(PE), TPU30(PE)-4.7TH and TPU30(PE)-4.1TD at 140° C. are shown in FIG. 22. For the non-ionic polymer, the melting point of the hard segment phase was 186° C., so the TPU was a semi-crystalline solid at 140° C.

As a result, there was no melt flow ($\eta^* \to \infty$) and the data were consistent with yielding of a solid (slope~−1). In contrast, the ionomers did exhibit melt flow with relatively low viscosities, ~300-400 Pa·s at higher frequencies, which would be more typical for conventional polymer processing operations. The improved processability of the ionomers is a result of the suppression of crystallinity in these materials, and is perhaps a result of some plasticization imparted by the bulky quaternary ammonium sulfonate (QAS) groups.

In sum, the TPU ionomers of the present invention are softened via internal plasticization, i.e., without using a potentially fugitive plasticizer, and demonstrate the potential for creating a family of TPU ionomers with a range of hardness by simply varying the counterion used in the ionic internal plasticizer. This was achieved using a conventional TPU manufacturing process by adding an additional ionic monomer, a commercial sulfonate-containing diol that was modified to a quaternary ammonium salt (QAS) diol prior to polymerization. The Shore A durometer values for the TPU ionomers were decreased from non-ionic TPU controls (i.e., TPUs with comparable hard segment content) by as much as 35 durometer points, depending on the counterion and ionic monomer content (see Table 1). It is believed that that the presence of the QAS entity in the polymer internally plasticizes the TPU. This may be, in part, responsible for achieving low durometer TPUs, but it is believed that the primary reason for increasing the softness of the TPU was suppression of crystallization. As set forth above, the crystallization suppression was either due to slower crystallization kinetics or disruption of the hard segment crystallinity, caused by the bulky ammonium counterion. In addition to lowering the durometer of the TPU ionomers of the present invention, the incorporation of the QAS-sulfonates was found to lower the melt viscosity and the temperature at which melt flow occurred for the TPUs, the latter which was a result of the lower crystallinity of these TPUs. Further, the tensile modulus decreased, the strain at break increased, and the ultimate stress of the TPU decreased (see, Table 2) as the sulfonation level increased.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

All commercial reagents and solvents referenced herein were used as received without further purification, unless noted otherwise. Anhydrous tetrahydrofuran (THF), anhydrous dimethylformamide (DMF), 4,4"-methylenebis(phenyl isocyanate) (MDI), 1,4-butanediol (BDO), stannous octoate, Amberlite® IRN-78 hydroxide form, didodecyldimethylammonium bromide (DDA-Br), tetrahexylammonium bromide (THA-Br), terakis(decyl) ammonium bromide (TDA-Br), and N,N-bis (2-hydroxyethyl)-2-aminoethane-sulfonic acid (BES) were purchased from Sigma-Aldrich. The 2,000 $\hat{M}_W$ polycarbonate (PC) Desmophen® C1200 and polyester (PE) diols Desmophen® 2000 were provided by Covestro LLC (formerly Bayer MaterialsScience LLC) and dried under high vacuum to remove any residual solvent. Desmophen® C1200 and Desmophen® 2000 are commercially available from Covestro LLC (formerly Bayer MaterialsScience LLC).

Example 1

Preparation of Ionic Monomers

The ammonium bromide salts (DDA-Br, THA-Br and TDA-Br) were dissolved in a 75:25 (v/v) methanol/water mixture to produce a 20.0 g/L solution. For example: 5.00 g (7.60 mmol) of TDA-Br was dissolved in 250 mL of a methanol/water mixture. The hydroxide exchange column was packed with 15.0 mL (1.10 meq) of Amberlite® IRN-78 residue suspended in the methanol/water mobile phase. The ammonium bromide salt solutions were slowly passed through the exchange column, with a flow rate of ~1 drop/sec. The basicity of the eluent was monitored using pH paper to ensure that the bromide anion was being exchanged for hydroxide. The resulting ammonium hydroxide solutions were neutralized by adding solid BES with sonication to ensure sufficient dissolution and mixing. Once the solutions were completely neutralized, the methanol/water solvent was removed via rotary evaporation, followed by lyophilization. The resulting crude products contained clear to off-white, viscous liquids as well as some white solids. The viscous liquids were extracted by dissolving the mixtures in THF and filtering off the insoluble salts. The THF was then removed via rotary evaporation, and the purified ammonium salt-BES monomers (DDA-BES, THA-BES and TDA-BES) were obtained. $^1$H-NMR confirmed the successful syntheses and purity of these ionic monomers, with typical yields between 75-90%. Ionic monomers (FIG. 3-5) e.g., TDA-BES, $^1$H-NMR (300 MHz, DMSO-$d_6$) $\delta$: 0.91 (t, 12H), 1.29 (m, 56H), 1.51-1.68 (br, 8H), 2.56 (t, overlaps with DMSO-$d_6$, 2H), 2.50 (t, overlaps with DMSO-d6, 4H), 2.79 (t, 2H), 3.11-3.26 (br, 8H), 3.40 (m, 4H), 4.41 (t, 2H).

Example 2

Solution Polymerization of TPU and TPU Ionomers

Reactions using PC diols were carried out in DMF, whereas PE diol reactions were performed in THF as a result of the diol solubility. The following procedure describes the pre-polymer technique and is designed to produce a 30 wt % hard segment TPU, with and without ionic monomer. In a separate container, 8.00 g (4.00 mmol, 1.00 eq) of PC or PE diol was dissolved in 8-9 mL of DMF or THF, respectively, to produce a ~50 wt % solution of the diol. A 250 mL three-neck reaction flask equipped with a condenser, injection port, and mechanical stirrer was preheated to 65° C. Then, 3.10 g (12.4 mmol, 3.10 eq) of MDI (solid) was added to the pre-heated reaction flask and purged with dry $N_2$ in order to melt the MDI, yet the temperature was low enough to limit dimerization. The diol solution (50 wt %) was added drop-wise to the reaction flask over a period of 10-15 minutes using a syringe pump while stirring the solution at 250 rpm. The slow addition of diol solution allowed for sufficient heat dissipation to control the temperature of the exothermic reaction that produced an isocyanate-terminated pre-polymer. After 2-3 h, an aliquot was taken from the reaction solution, and the isocyanate (NCO) concentration was measured by titration method using ASTM Standard D2572-97. When the desired NCO content was achieved, the pre-polymer was chain-extended.

For a non-ionic TPU, 745 µL (8.40 mmol, 2.10 eq) of BDO was dissolved in 1-2 mL of DMF/THF to produce a 30 wt % solution, along with 2-3 drops (~0.1 eq, <0.2 wt %) of stannous octoate (if catalyst was utilized). The BDO/catalyst mixture was added dropwise via syringe pump into the reactor over a period of 5 min, with continuous stirring at 250 rpm and $N_2$ purge. Non-ionic TPUs (FIGS. 8-9), e.g. 30 wt % hard segment content, $^1$H-NMR (300 MHz, DMSO-$d_6$) δ: 1.54 (m, 44H), 1.71 (m, 4H), 2.31 (m, 44H), 3.79 (s, 2H), 4.10 (m, 4H), 4.21 (t, overlaps with previous peak, 48H), 7.22 (dd, J=7.94 Hz, 8H), 9.49-9.61 (m, 2H).

For a TPU ionomer, a mixture (totaling 8.40 mmol, 2.10 eq) of BDO and the desired ionic monomer (DDA-BES, THA-BES, or TDA-BES) was dissolved in 3-4 mL of DMF/THF to produce a 30 wt % solution, along with 2-3 drops of stannous octoate (if catalyst was utilized). The targeted weight percent of ionic monomer was calculated based on the molecular mass of the ionic monomer and the molar equivalents used, e.g. if a TPU containing 5 wt % THA-BES (566.92 g/mol) is desired, then 0.680 g (1.20 mmol, 0.30 eq) of THA-BES and 638 µL (7.20 mmol, 1.80 eq) of BDO are used. The BDO/ionic monomer/catalyst mixture was added dropwise via syringe pump into the reactor over a period of 5 min, with continuous stirring at 250 rpm and $N_2$ purge. After 2-3 h, an aliquot was taken and FT-IR was performed to confirm the absence of NCO. The resulting reaction solution was precipitated into cold methanol and filtered. If necessary, the product was re-dissolved in minimal THF and precipitated again into diethyl ether. The product was dried in an oven vacuum at 50° C. for 48 h. TPU ionomers (FIGS. 10-13), e.g. 4.1% TDA-BES TPU with 32.7 wt % hard segment content using PE diol, "TPU30 (PE)-4.1TD," $^1$H-NMR (300 MHz, DMSO-$d_6$) δ: 0.85 (t, 12H), 1.25 (m, 56H), 1.52 (m, 44H), 1.69 (m, 4H), 2.30 (m, 44H), 3.77 (s, 2H), 4.09 (m, 4H), 4.19 (t, overlaps with previous peak, 48H), 7.21 (dd, J=7.96 Hz, 8H), 9.47-9.59 (m, 2H).

Example 3

Bulk Polymerization of TPU and TPU Ionomers

For the purposes of achieving higher molecular weight (MW) polyurethanes and to ensure scalability, the TPU syntheses were also performed under bulk conditions. To produce 100 g of non-ionic TPU, 80.0 g (40.0 mmol, 0.210 eq) of PE diol and 5.00 mL (56.0 mmol, 0.290 eq) of BDO were preheated in a C-enamel lined tin can at 100° C. with mechanical stirring at 2000 RPM. In a separate container, a 5% excess of MDI was heated in an oven at 60° C. until melted. The excess MDI was to account for loss during transfer, so that the desired amount of MDI was achieved (24.0 g, 96.0 mmol, 0.50 eq). The molten MDI was then poured into the reaction mixture containing diol species, and 3-5 drops of catalyst was added over a period of 10 s. After ~1 min of stirring at 250 RPM, the mixture became too viscous to stir and was poured/transferred onto Teflon paper. The resulting product was heated in an oven for 24 h at 90° C.

To produce 100 g of 5% TDA-BES TPU ionomer, 80.0 g (40.0 mmol, 0.208 eq) of PE diol, 4.32 mL (48.8 mmol, 0.254 eq) of BDO, and 5.74 g (7.30 mmol, 0.0480 eq) of TDA-BES were preheated in a C-enamel lined tin can at 100° C. with mechanical stirring at 200 RPM. In a separate container, a 5% excess of MDI was heated in an oven at 60° C. until melted. The excess MDI was to account for loss during transfer, so that the desired amount of MDI was achieved (24.0 g, 96.0 mmol, 0.500 eq). The molten MDI was then poured into the reaction mixture containing diol species, and 3-5 drops of catalyst was added over a period of 10 s. Qualitatively, a notable decrease in the bulk viscosity could be seen for the TPU ionomers compared to the control TPU, allowing for longer reaction times. After ~2-3 min of stirring at 250 RPM, the mixture became too viscous to stir and was poured/transferred onto Teflon paper. The resulting product was heated in an oven for 24 h at 90° C.

Example 4

$^1$H-NMR and FT-IR $^1$H-NMR spectra of monomers and polymers described above were obtained using a Varian NMRS 300 MHz spectrometer. All chemical shifts are reported in ppm (δ), and referenced to the chemical shifts of residual solvent resonances ($CDCl_3$ 7.26 ppm, $D_2O$ 4.79 ppm, DMSO-d6 2.50 ppm). Abbreviations for multiplicities are listed as following: s=singlet, d=doublet, t=triplet, br=broad singlet, m=multiplet. FT-IR spectra were recorded by a Digilab Excalibur Series FTS3000, with a scanned wavenumber range from 400 to 4000 $cm^{-1}$. Samples were prepared by adding several drops of the reaction mixture to KBr pellets and spectra were recorded after 64 scans. The baseline was deducted and normalized to the C—H stretch peak intensity. The results are shown in FIGS. 2-5, 8-14.

Example 5

Durometer Analysis

Figure 15:
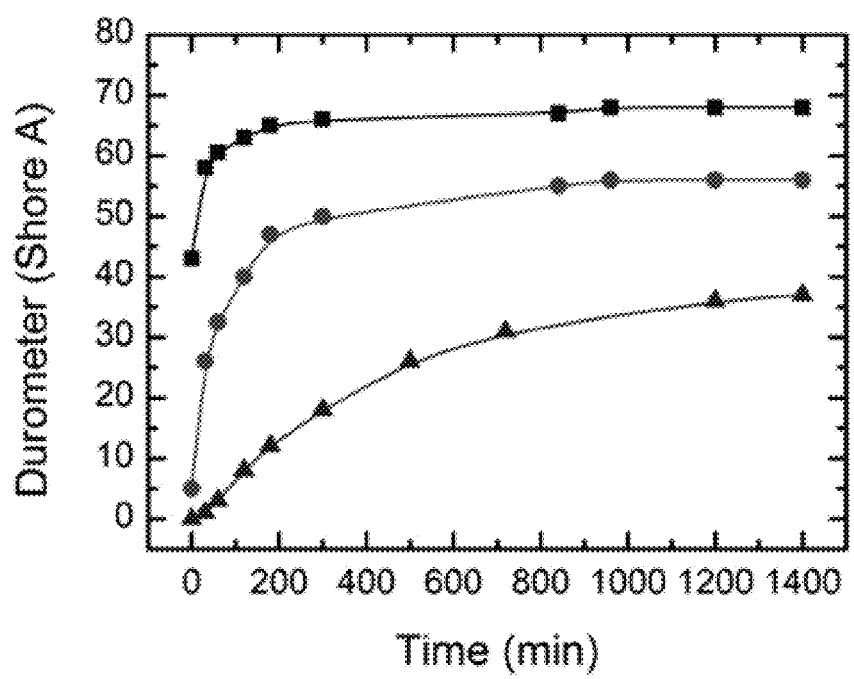
FIG. 15 is a graph showing the time dependence of Shore A durometer values for a non-ionic TPU (■, TPU25(PE) Sn), and TPU ionomers with ~4% (●, TPU25(PE)-4.4TD) and 8% (▲, TPU25(PE)-7.6TD) TDA-BES monomer. The durometer was measured over a 24 h period (t=0 is immediately following compression molding cooling cycle to room temperature), and indicates changes in the crystallization rate/behavior upon increasing incorporation of ionic monomer.

Durometer measurements were performed on compression molded, cylindrical samples (thickness: 6.35 mm, diameter: 14.0 mm) of the polymers described above. A type A-2 Shore A durometer hardness tester (Shore Instrument & MFG Co. New York) was used, following the test procedure described in ASTM 2240, which is hereby incorporated by reference in its entirety. In this method, a specimen having a thickness of about 6.4 mm is first placed on a hard flat surface. The indentor for the instrument is then pressed into the specimen making sure that it is parallel to the surface. Unless otherwise specified, the hardness is then read within one second of firm contact with the specimen. The instrument was calibrated using a standardized Shore A 60 material prior to each measurement. The results are shown in FIGS. 15 and 19 Table 1.

Example 6

Analysis of Thermal Properties

Differential scanning calorimetry (DSC) was performed of polymers described above using a TA Instruments Q2000 DSC on sample sizes of ~10-15 mg using temperature ramps for heating and cooling of 30° C./min and a cooling rate of 30° C./min. The dynamic mechanical analysis (DMA) was performed using a TA Instruments Q800 Dynamic Mechanical Analyzer. Thin sheets of compression molded sample (thickness: 0.5 mm) were cut into rectangular pieces (width: 3.0 mm) for all measurements. The results are shown in FIGS. 15, 16, and 19.

Example 7

Small Angle X-ray Scattering (SAXS)

SAXS experiments were performed on the polymers described above using a Rigaku MicroMax 002+ equipped with a 2D multiwire area detector and a sealed copper tube (CuK$_\alpha$ radiation, X=1.54 Å). The voltage and current for the X-ray tube were 45 kV and 0.88 mA, respectively. The results are shown in FIG. 20.

Example 8

Analysis of Mechanical Properties

Uniaxial tensile tests were carried out on of the polymers described above using an Instron Universal Testing Machine (Model 5567) in accordance with ASTM D638 for dumbbell shape Type V and an extension rate of 500 mm/min using a 1 kN load cell. The samples containing 5 mol % ionic species or less were injection molded at ~185° C. using a HAAKE MiniJet Injection Molding System. The sample with 7.6 mol % ionic species was injection molded at ~155° C. After they were molded, the samples were aged in the laboratory at room temperature and ambient conditions for 48 h prior to testing. At least 4 specimens were used to calculate the tensile properties for each material. Oscillatory shear rheology measurements were performed on thin sheets of compression molded samples (thickness: 0.5 mm) using a TA Instruments ARES-G2 Rheometer, equipped with 8 mm parallel plates. The linear viscoelastic response region was determined with a strain sweep conducted at a frequency of ω=1 rad·s$^{-1}$. Dynamic mechanical analysis (DMA) was performed using a TA Instruments Q800 dynamic mechanical analyzer. Samples were cut from compression molded films (thickness~0.5 mm). Dynamic tensile measurements were made using strain amplitudes, ε=0.1-5% depending on temperature, and temperature was scanned from −80° C. to 140° C. using a heating rate of 2° C./min (ε=0.2%, ε=1 rad·s$^{-1}$). The results are shown in FIGS. 18 and 21 and Table 2.

In light of the foregoing, it should be appreciated that the present invention significantly advances the art by providing a TPU ionomer, chain extender, and related methods that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A thermoplastic polyurethane ionomer comprising a residue of an ionic monomer comprising (i) 2,3-dihydroxypropanesulfonate; and (ii) a quaternary ammonium cation, wherein the ionic monomer has been covalently bonded into the backbone of the thermoplastic polyurethane ionomer.

2. The thermoplastic polyurethane ionomer of claim 1, wherein the quaternary ammonium cation is selected from the group consisting of didodecyldimethylammonium (DDA), a tetrahexylammonium (THA), terakis(decyl)ammonium (TDA), trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylanmnonium, tridodecylmethylammonium, tricaprylylmethylammonium methyltrioctylammonium, tributylmethylammonium, tetraoctadecylammonium, tetrahexadecylammonium, tetradodecylammonium, tetrakis(decyl)ammonium, tetraoctylammonium, tetraheptylammonium, tetrahexylammonium, tetrabutylammonium, and combinations thereof.

3. The thermoplastic polyurethane ionomer of claim 1, wherein the nitrogen atom of the quaternary ammonium cation contains no more than three methyl side groups.

4. The thermoplastic polyurethane ionomer of claim 3, wherein the quaternary ammonium cation has the formula:

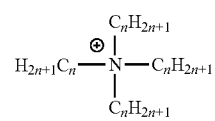

wherein n is an integer from 1 to 18.

5. The thermoplastic polyurethane ionomer of claim 1 having the formula:

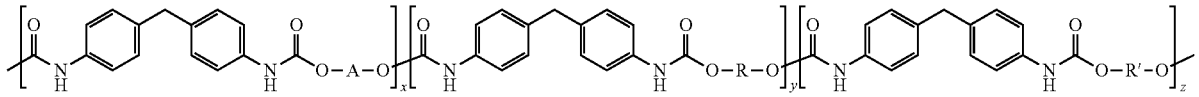

wherein A is a residue of a polyester, polycarbonate, polyether or polyamide diol having a weight average molecular weight of from 500 g/mol to about 10,000 g/mol; R is the residue of an ionic monomer comprising 2,3-dihydroxypropanesulfonate and a quaternary ammonium cation; R' is a residue of a C$_2$ to C$_{12}$ diol; x is a mole fraction from about 0.005 to about 0.8; y is a mole fraction from about 0.005 to about 0.8; and z is mole fraction from about 0.005 to about 0.9.

6. The thermoplastic polyurethane ionomer of claim 5 wherein A is the residue of a diol having a formula selected from:

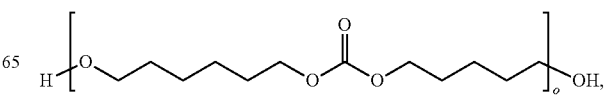

-continued

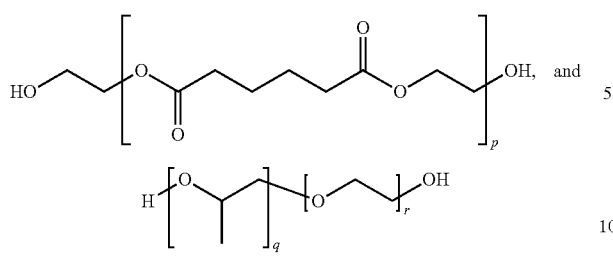

wherein o is an integer from about 1 to about 1000; p is an integer from about 1 to about 1000; q is an integer from about 1 to about 500; and r is an integer from about 1 to about 500.

7. The thermoplastic polyurethane ionomer of claim 5 having a Shore A durometer hardness of from about 20 to about 100.

8. The thermoplastic polyurethane ionomer of claim 1 wherein the residue of the ionic monomer comprise from about 0,5% to about 30% by weight of the thermoplastic polyurethane ionomer.

9. A thermoplastic polyurethane ionomer comprising the residue of an ionic monomer comprising (i) polyethersulfonate; and (ii) a quaternary ammonium cation, wherein the nitrogen atom of the quaternary ammonium cation contains no more than three methyl side groups, and wherein the ionic monomer has been covalently bonded into the backbone of the thermoplastic polyurethane ionomer.

10. The thermoplastic polyurethane ionomer of claim 9, wherein the polyethersulfonate is

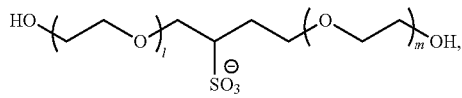

wherein l is an integer from 1 to 20; and m is an integer from 1 to 2.

11. The thermoplastic polyurethane ionomer of claim 9, wherein the quaternary ammonium cation is selected from the group consisting of didodecyldimethylammonium (DDA), a tetrahexylammonium (THA), terakis(decyl)ammonium (TDA), trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylanmnonium, tridodecylmethylammonium, tricaprylylmethylammonium methyltrioctylammonium, tributylmethylammonium, tetraoctadecylammonium, tetrahexadecylammonium, tetradodecylammonium, tetrakis (decyl)ammonium, tetraoctylammonium, tetraheptylammonium, tetrahexylammonium, tetrabutylammonium, and combinations thereof.

12. The thermoplastic polyurethane ionomer of claim 9, wherein the quaternary ammonium cation has the formula:

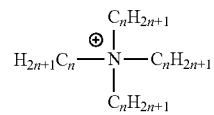

wherein n is an integer from 1 to 18 and the nitrogen atom of the quaternary ammonium cation contains no more than three methyl side groups.

13. The thermoplastic polyurethane ionomer of claim 9 having the formula:

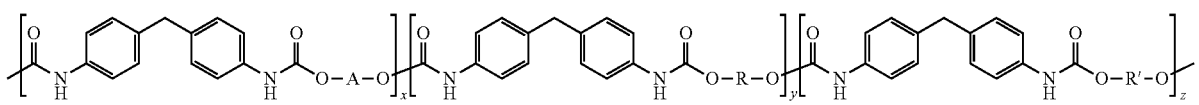

wherein A is the residue of a polyester, polycarbonate, polyether or polyamide diol having a weight average molecular weight of from 500 g/mol to about 10,000 g/mol; R is the residue of an ionic monomer comprising a sulfonate anion containing diol and a quaternary ammonium cation; R' is a residue of a $C_2$ to $C_{12}$ diol; x is a mole fraction from about 0.005 to about 0.8; y is a mole fraction from about 0.005 to about 0.8; and z is mole fraction from about 0.005 to about 0.9.

14. The thermoplastic polyurethane ionomer of claim 13 wherein A is the residue of a diol having a formula selected from:

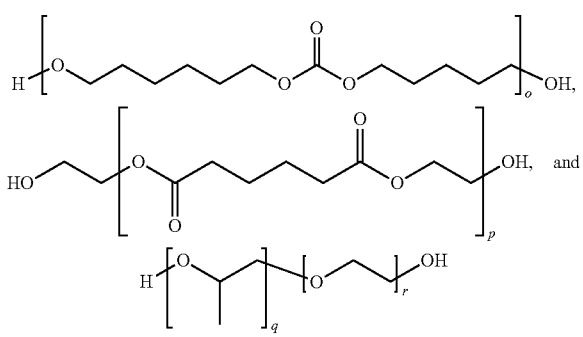

wherein o is an integer from about 1 to about 1000; p is an integer from about 1 to about 1000; q is an integer from about 1 to about 500; and r is an integer from about 1 to about 500.

15. The thermoplastic polyurethane ionomer of claim 13 having a Shore A durometer hardness of from about 20 to about 100.

16. The thermoplastic polyurethane ionomer of claim 9 wherein the residue of the ionic monomer comprise from about 0.5% to about 30% by weight of the thermoplastic polyurethane ionomer.

17. A method of making the thermoplastic polyurethane ionomer of claim 1 comprising:
   A) preparing an ionic monomer comprising a sulfonic acid containing polyol anion and a quaternary ammonium cation, said ionic monomer further comprising at least two hydroxyl functional groups;
   B) reacting a diisocyanate with one or more linear polyol to form a isocyanate-terminated pre-polymer;

C) preparing a solution containing said ionic monomer and an additional quantity of one or more linear polyol; and D) reacting the ionic monomer solution of step C with said isocyanate-terminated pre-polymer to form a thermoplastic polyurethane ionomer having the residue of said ionic monomer integrated into the backbone of the thermoplastic polyurethane ionomer.

18. The method of claim 17 wherein said step of reacting further comprises addition of a catalyst selected from the group consisting of stannous octoate, 1,4-diazabicyclo [2.2.2.] octane (DABCO), dibutyltin dilaurate, bismuth octanoate, UV light, and combinations thereof.

19. The method of claim 17 wherein the ionic monomer of step A comprises an anion selected from 2,3-dihydropropanesulfonic acid, polyethersulfonate, and a combinations thereof.

20. The method of claim 17 wherein the ionic monomer of step A comprises an anion having the formula:

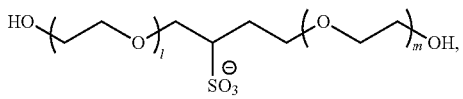

wherein l is an integer from 1 to 20; and m is an integer from 1 to 2.

21. The method of claim 17 wherein said quaternary ammonium cation is selected from the group consisting of a didodecyldimethylammonium (DDA) cation, a tetrahexylammonium (THA) cation, a terakis(decyl)ammonium (TDA) cation, trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis (decyl)ammonium, tetraoctylammonium, tetraheptylammonium, tetrahexylammonium, tetrabutylammonium, and combinations thereof.

22. The method of claim 17 wherein said quaternary ammonium cation has the formula:

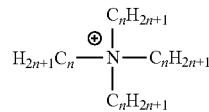

where n is an integer from 1 to 18.

23. The method of claim 17 wherein said ionic monomer has the formula:

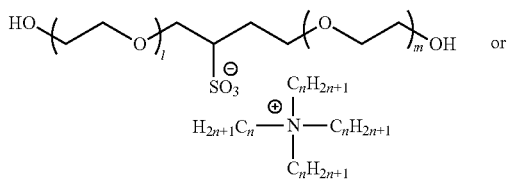

or

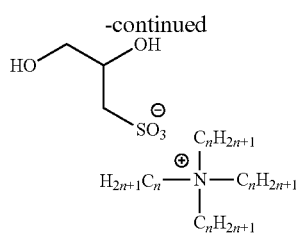

where l is an integer from 1 to 20; m is an integer from 1 to 20; n is an integer from 1 to 18; and the nitrogen atom of the quaternary ammonium cation contains no more than three methyl side groups.

24. The method of claim 17 wherein said diisocyanate is selected from the group consisting of 4,4'-methylenebis (phenyl isocyanate) (MDI), isophorone diisocyanate (IPDI), tolylene-2,4-diisocyanate (TDI), and combinations thereof.

25. The method of claim 17 wherein said diisocyanate comprises 1,12-diisocyanatododecane, 1,8-diisocyanatooctane, 1,6-diisocyanatohexane, 1,4-diisocyanatobutane, 1,3-bis(isocyanatomethyl)cyclohexane, 1,3-phenylene diisocyanate, and tolylene-2,6-diisocyanate, 1,5-diisocyanatopentane, 4,4'-methylenebis(cyclohexyl isocyanate), or combinations and isomers thereof.

26. The method of claim 17 wherein the one or more linear polyol of steps B and C are each selected from the group consisting of: polycarbonate diols, polyester dials, polyether diols, or polyamide diols having a weight average molecular weight of from about 500 g/mol to about 10,000 g/mol; linear C2-C12 diols; and combinations thereof.

27. The method of claim 17 wherein the step of preparing an ionic monomer (step A) further comprises:
1) dissolving a chloride, bromide, or iodide salt of a quaternary ammonium compound in a suitable solvent;
2) passing said chloride, bromide, or iodide salt of a quaternary ammonium compound through a hydroxide exchange column to exchange the chloride, bromide, or iodide anions for hydroxide anions, thereby forming a solution containing the hydroxide salt of said quaternary ammonium compound; and
3) adding a sulfonic acid containing polyol to said solution containing the hydroxide salt of the quaternary ammonium to form an ionic monomer comprising a sulfonate containing polyol anion and the quaternary ammonium cation.

28. The method of claim 17 wherein the step of reacting a diisocyanate with one or more linear polyol to form an isocyanate-terminated pre-polymer further comprises:
a) dissolving said one or more linear polyol in a suitable solvent or miscible combination of solvents;
b) placing liquid or melted diisocyanate in a suitable reaction vessel, wherein said melted diisocyanate is melted at a temperature above the melting point, but below the dimerization temperature of said diisocyanate; and
c) adding the polyol solution to said liquid or melted diisocyanate dropwise over a period of from about 1 minutes to about 15 minutes and then stirring for a period of from about 1 hours to about 3 hours at a temperature of from about 50° C. to about 100° C.; wherein said polyols and said diisocyanates react to form a isocyanate-terminated prepolymer comprising the residues of said one or more polyols and said diisocyanate.

29. The method of claim 17 wherein the step of reacting said ionic monomer with said isocyanate-terminated prepolymer (Step D) further comprises:
   i) dissolving said ionic monomer and one or more linear polyol in a suitable solvent;
   ii) adding the ionic monomer/linear polyol solution of step (i) to the isocyanate-terminated prepolymer solution of step B over a period of from about 1 minutes to about 15 minutes under an inert atmosphere; and
   iii) stirring the mixture of step (ii) for a period of from about 2 hours to about 5 hours at a temperature of from about 50° C. to about 100° C. to produce the thermoplastic polyurethane ionomer of step D.

30. The method of claim 29 wherein step (i) further comprises adding a catalyst selected from the group consisting of stannous octoate, 1,4-diazabicyclo[2.2.2.]octane (DABCO), dibutyltin dilaurate, bismuth octanoate, UV light and combinations thereof.

31. A method of making the thermoplastic polyurethane ionomer of claim 1 comprising:
   A) preparing an ionic monomer comprising a sulfonic acid containing polyol anion and a quaternary ammonium cation, said ionic monomer further comprising at least two hydroxyl functional groups;
   B) combining said ionic monomer, a first diol selected from the group consisting of polycarbonate diols, polyester diols, polyether doils, polyamide diols and combinations thereof and having a weight average molecular weight of from 500 g/mol to about 10,000 g/mol; and a second diol selected from the group consisting of linear C2-C12 diols, 1,4-butanediol (BDO), ethylene glycol, 1,3-propanediol, 1,4-butanediol, 1,6-hexanediol, 1,8-octanediol, 1,10-decanediol, 1,12-dodecanediol, and combinations thereof, in a suitable reaction vessel;
   C) preparing, in the case of a liquid, or melting and preparing, in the case of a solid, a quantity of diisocyanate that is from 0 weight percent to about 10 weight percent in excess of the quantity to be used to form said thermoplastic polyurethane ionomer, at a temperature above the melting point, but below the dimerization temperature of said isocyanate; and
   D) adding the diisocyanate of step C and a catalyst to the diol mixture of step B to produce a thermoplastic polyurethane ionomer comprising the residue of said diisocyanate, said ionic monomer, said first diol, and said second diol.

32. A thermoplastic polyurethane ionomer comprising a residue of an ionic monomer comprising a sulfonic acid containing polyol anion and a quaternary ammonium cation and having a formula selected from:

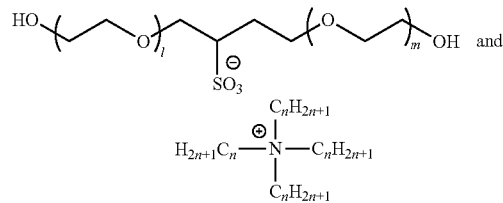 and

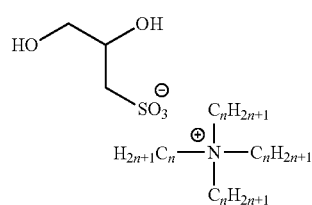

wherein l is an integer from 1 to 20; m is an integer from 1 to 20; and n is an integer from 1 to 18, and the nitrogen atom of the quaternary ammonium cation contains no more than three methyl side groups.

33. The thermoplastic polyurethane ionomer of claim 32 wherein the ionic monomer has been covalently bonded into the backbone of the thermoplastic polyurethane ionomer.

34. The thermoplastic polyurethane ionomer of claim 32 wherein the ionic monomer has the formula:

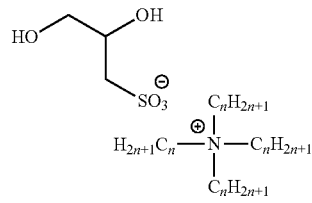

wherein n is an integer from 5 to 18.

35. The thermoplastic polyurethane ionomer of claim 32 wherein the ionic monomer has the formula:

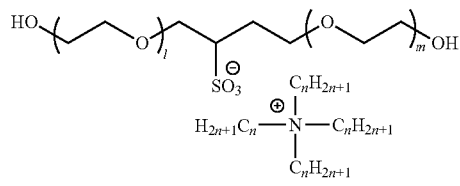

wherein l is an integer from 1 to 20; m is an integer from 1 to 20; and n is an integer from 5 to 18.

36. The thermoplastic polyurethane ionomer of claim 32 having the formula:

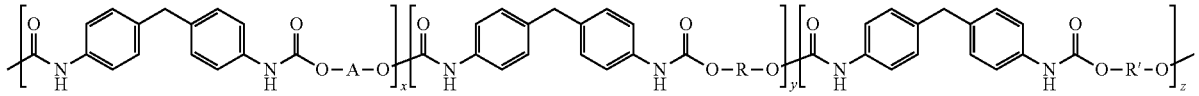

wherein A is a residue of a polyester, polycarbonate, polyether or polyamide diol having a weight average molecular weight of from 500 g/mol to about 10,000 g/mol; R is the residue of said ionic monomer; R' is a residue of a $C_2$ to $C_{12}$ diol; x is a mole fraction from about 0.005 to about 0.8; y is a mole fraction from about 0.005 to about 0.8; and z is mole fraction from about 0.005 to about 0.9.

37. The thermoplastic polyurethane ionomer of claim 36 wherein A is the residue of a diol having a formula selected from;

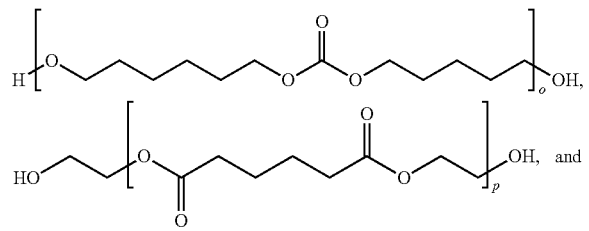

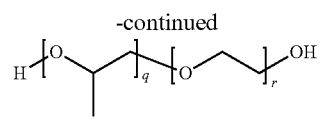

wherein o is an integer from about 1 to about 1000; p is an integer from about 1 to about 1000; q is an integer from about 1 to about 500; and r is an integer from about 1 to about 500.

38. The thermoplastic polyurethane ionomer of claim 32 having a Shore A durometer hardness of from about 20 to about 100.

39. The thermoplastic polyurethane ionomer of claim 32 wherein the residue of the ionic monomer comprise from about 0.5% to about 30% by weight of the thermoplastic polyurethane ionomer.

\* \* \* \* \*

UNITED STATES PATENT AND TRADEMARK OFFICE
CERTIFICATE OF CORRECTION

PATENT NO. : 11,225,543 B2
APPLICATION NO. : 16/286024
DATED : January 18, 2022
INVENTOR(S) : Matthew Becker et al.

It is certified that error appears in the above-identified patent and that said Letters Patent is hereby corrected as shown below:

In the Claims

In Claim 19, Lines 2-3, the term "2,3-dihydropropanesulfonic acid" should be "2,3-dihydroxypropanesulfonic acid".

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*